United States Patent
Dragt

(10) Patent No.: US 9,077,800 B2
(45) Date of Patent: *Jul. 7, 2015

(54) SYSTEMS, METHODS, AND DEVICES FOR PROCESSING FEEDBACK INFORMATION RECEIVED FROM MOBILE DEVICES RESPONDING TO TONE TRANSMISSIONS

(75) Inventor: Bruce Dragt, Marietta, GA (US)

(73) Assignee: First Data Corporation, Greenwood Village, CO (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/396,263

(22) Filed: Mar. 2, 2009

(65) Prior Publication Data

US 2010/0223346 A1    Sep. 2, 2010

(51) Int. Cl.
G06F 15/16 (2006.01)
H04M 3/493 (2006.01)
G06Q 30/02 (2012.01)

(52) U.S. Cl.
CPC .............. *H04M 3/493* (2013.01); *G06Q 30/02* (2013.01); *H04M 2207/18* (2013.01); *H04M 2242/15* (2013.01); *H04M 2242/30* (2013.01)

(58) Field of Classification Search
CPC ........ H04L 51/18; H04L 67/20; G06Q 30/02; G06Q 30/0267; H04M 3/493; H04M 2242/15; H04M 2242/30
USPC ........................................................ 709/206
See application file for complete search history.

(56) References Cited

U.S. PATENT DOCUMENTS

| | | |
|---|---|---|
| 3,209,086 A | 9/1965 | Boylan |
| 4,368,354 A | 1/1983 | Furihatd |
| 5,574,962 A | 11/1996 | Fardeau |
| 5,642,425 A | 6/1997 | Kawakami |
| 5,787,334 A | 7/1998 | Fardeau |
| 5,809,425 A | 9/1998 | Colwell et al. |
| 6,044,158 A | 3/2000 | Terpening |
| 6,370,389 B1 | 4/2002 | Isomursu et al. |
| 6,389,055 B1 | 5/2002 | August et al. |
| 6,449,346 B1 | 9/2002 | Katz |

(Continued)

OTHER PUBLICATIONS

Disclosure Under 37 C.F.R. 1.56 (3 pages).

(Continued)

*Primary Examiner* — Waseem Ashraf
(74) *Attorney, Agent, or Firm* — Sutherland Asbill & Brennan LLP

(57) ABSTRACT

Systems, methods, and devices for processing feedback information received from mobile device responding to tone transmission are provided. One system may include a memory for storing computer-executable instructions, and an information source processor in communication with the memory, wherein the processor is configured to execute the computer-executable instructions to associate a location identifier with user prompting information and transmit the location identifier to a tone transmission device, where the location identifier is embedded in a tone. The processor is further configured to execute the computer-executable instructions to receive the location identifier that was sent from a mobile device that received the tone from the tone transmission device, retrieve, from the memory, user prompting information based on the location identifier, and transmit the user prompting information to the mobile device. The system may further include receiving feedback information from the mobile device and transmit additional content based on the received feedback information.

6 Claims, 7 Drawing Sheets

(56) References Cited

U.S. PATENT DOCUMENTS

| | | | |
|---|---|---|---|
| 6,597,890 B1* | 7/2003 | Sibecas et al. | 455/3.04 |
| 6,598,890 B2* | 7/2003 | Mears et al. | 280/79.3 |
| 6,604,085 B1 | 8/2003 | Kolls | |
| 6,662,007 B2 | 12/2003 | Yuen | |
| 6,934,684 B2 | 8/2005 | Alpdemir | |
| 7,062,281 B2 | 6/2006 | Blink et al. | |
| 7,065,494 B1 | 6/2006 | Evans | |
| 7,092,724 B2 | 8/2006 | Fellenstein | |
| 7,124,937 B2 | 10/2006 | Myers et al. | |
| 7,188,065 B2 | 3/2007 | Mihcah | |
| 7,188,352 B2 | 3/2007 | Nathan | |
| 7,310,522 B2 | 12/2007 | Geile | |
| 7,328,236 B2 | 2/2008 | Hayek et al. | |
| 7,343,317 B2 | 3/2008 | Jokinen | |
| 7,433,452 B2 | 10/2008 | Taylor et al. | |
| 7,460,991 B2 | 12/2008 | Jones et al. | |
| 7,463,898 B2 | 12/2008 | Bayne | |
| 7,487,362 B2 | 2/2009 | Steenstra | |
| 7,505,922 B1 | 3/2009 | Philyaw | |
| 7,721,958 B2 | 5/2010 | Belfer et al. | |
| 8,041,293 B2 | 10/2011 | Brown et al. | |
| 8,249,559 B1* | 8/2012 | Meiss et al. | 455/412.1 |
| 8,577,345 B2 | 11/2013 | Dragt et al. | |
| 8,577,346 B2 | 11/2013 | Dragt et al. | |
| 8,606,638 B2 | 12/2013 | Dragt et al. | |
| 8,725,121 B2 | 5/2014 | Dragt et al. | |
| 8,825,093 B2* | 9/2014 | Vaananen | 455/466 |
| 2001/0055391 A1* | 12/2001 | Jacobs | 380/241 |
| 2002/0010621 A1 | 1/2002 | Bell | |
| 2002/0095333 A1 | 7/2002 | Jokinen et al. | |
| 2002/0120501 A1 | 8/2002 | Bell | |
| 2002/0126813 A1 | 9/2002 | Partovi | |
| 2002/0133818 A1 | 9/2002 | Rottger | |
| 2003/0028601 A1 | 2/2003 | Rowe | |
| 2003/0200184 A1 | 10/2003 | Dominguez et al. | |
| 2004/0133789 A1 | 7/2004 | Gantman | |
| 2005/0105725 A1 | 5/2005 | Lee | |
| 2005/0114141 A1* | 5/2005 | Grody | 704/270 |
| 2005/0124351 A1 | 6/2005 | Black | |
| 2006/0014569 A1 | 1/2006 | DelGiorno | |
| 2006/0084488 A1 | 4/2006 | Kinsley | |
| 2006/0174274 A1 | 8/2006 | Vance et al. | |
| 2006/0240808 A1* | 10/2006 | Crolley | 455/414.1 |
| 2007/0063027 A1 | 3/2007 | Belfer et al. | |
| 2007/0078709 A1 | 4/2007 | Rajaram | |
| 2007/0179853 A1 | 8/2007 | Feige et al. | |
| 2007/0187482 A1 | 8/2007 | Castro | |
| 2007/0189474 A1 | 8/2007 | Cai | |
| 2007/0237313 A1* | 10/2007 | Martino | 379/93.25 |
| 2007/0297455 A1 | 12/2007 | McParland | |
| 2008/0010215 A1 | 1/2008 | Rackley, III et al. | |
| 2008/0019706 A1 | 1/2008 | Levinson | |
| 2008/0027567 A1* | 1/2008 | Philyaw | 700/40 |
| 2008/0065507 A1 | 3/2008 | Morrison | |
| 2008/0114481 A1 | 5/2008 | Braithwaite et al. | |
| 2008/0152138 A1 | 6/2008 | Chiu | |
| 2008/0215436 A1 | 9/2008 | Roberts | |
| 2008/0262928 A1* | 10/2008 | Michaelis | 705/14 |
| 2009/0042602 A1* | 2/2009 | Nagata et al. | 455/556.1 |
| 2009/0066722 A1* | 3/2009 | Kriger et al. | 345/619 |
| 2009/0076912 A1 | 3/2009 | Rajan et al. | |
| 2009/0106617 A1* | 4/2009 | Katis et al. | 714/748 |
| 2009/0143057 A1 | 6/2009 | Arun et al. | |
| 2009/0170482 A1 | 7/2009 | Alessio et al. | |
| 2009/0220063 A1* | 9/2009 | Miller et al. | 379/202.01 |
| 2009/0239514 A1* | 9/2009 | Kenagy et al. | 455/414.3 |
| 2009/0249388 A1 | 10/2009 | Seidel et al. | |
| 2010/0030838 A1 | 2/2010 | Atsmon et al. | |
| 2010/0080149 A1* | 4/2010 | Lee et al. | 370/259 |
| 2010/0106647 A1 | 4/2010 | Raman | |
| 2010/0211431 A1 | 8/2010 | Lutnick | |
| 2010/0222026 A1 | 9/2010 | Dragt et al. | |
| 2010/0222037 A1 | 9/2010 | Dragt et al. | |
| 2010/0222038 A1 | 9/2010 | Dragt et al. | |
| 2010/0222041 A1 | 9/2010 | Dragt et al. | |
| 2010/0222043 A1 | 9/2010 | Dragt et al. | |
| 2010/0222072 A1 | 9/2010 | Dragt et al. | |
| 2010/0222087 A1 | 9/2010 | Dragt et al. | |
| 2010/0222088 A1* | 9/2010 | Dragt | 455/466 |
| 2010/0222100 A1 | 9/2010 | Dragt et al. | |
| 2010/0223120 A1 | 9/2010 | Dragt et al. | |
| 2010/0223138 A1* | 9/2010 | Dragt | 705/14.64 |
| 2010/0223145 A1 | 9/2010 | Dragt et al. | |
| 2010/0226526 A1 | 9/2010 | Modro et al. | |

OTHER PUBLICATIONS

"Hearing Test—Can you Hear It?" Freemosquitoringtones.org. <http://www.freemosquitoringtones.org/hearing_test>. (4 pages).

Christensen-Dalsgaard, Jakob. "Center for Sound Communicaiton". Biology.sdu.dk. Oct. 17, 2000. Sep. 22, 2008. <http://www.biology.sdu.dk/Center_for_Lydkommunikation/gb/CSChome-eng.html>. (3 pages).

"Shazam on iPhone". Shazam.com. <http://www.shazam.com/music/web/pages/iphone.html>. (5 pages).

"Background". Shazam.com. <http://www.shazam.com/music/web/pages/background.html>. (2 pages).

"FAQs—Mosquito Teen Deterrent". Compoundsecurity.co.uk. <http://www.compoundsecurity.co.uk/faqs>. (1 page).

Vitello, Paul. (Jun. 12, 2006). "A Ring Tone Meant to Fall on Deaf Ears." New York Times. Retrieved from http://www.nytimes.com. (3 pages).

"Radio Reception on the Move and RDS (Radio Data System)". bbc.com. <http://www.bbc.co.uk/reception/info/pdf/factsheet_radiomove_rds.html>. (3 pages).

Non-final Office Action for U.S. Appl. No. 12/396,265 mailed Jan. 4, 2011 (filed Mar. 2, 2009).

Non-final Office Action for U.S. Appl. No. 12/396,256 mailed Jul. 8, 2011.

Non-final Office Action for U.S. Appl. No. 12/396,248 mailed Jun. 18, 2013.

Non-final Office Action for U.S. Appl. No. 12/396,248 mailed Aug. 30, 2011.

Non-final Office Action for U.S. Appl. No. 12/396,271 mailed Sep. 15, 2011.

Final Office Action for U.S. Appl. No. 12/396,259 mailed Oct. 21, 2011.

Non-final Office Action for U.S. Appl. No. 12/396,259 mailed Feb. 16, 2012.

Non-final Office Action for U.S. Appl. No. 12/396,242 mailed Aug. 3, 2011.

Non-final Office Action for U.S. Appl. No. 12/396,265 mailed Dec. 23, 2011.

Final Office Action for U.S. Appl. No. 12/396,240 mailed Nov. 2, 2011.

Finai Office Action for U.S. Appl. No. 12/396,258 mailed Nov. 4, 2011.

Final Office Action for U.S. Appl. No. 12/396,248 mailed Dec. 21, 2011.

Non-final Office Action for U.S. Appl. No. 12/396,258 mailed Feb. 16, 2012.

Final Office Action for U.S. Appl. No. 12/396,265 mailed Mar. 28, 2012.

Non-final Office Action for U.S. Appl. No. 12/396,265 mailed Aug. 22, 2012.

Final Office Action for U.S. Appl. No. 12/396,258 mailed Aug. 9, 2012.

Final Office Action for U.S. Appl. No. 12/396,265 mailed Mar. 28, 2013.

Notice of Allowance for U.S. Appl. No. 12/396,258 mailed Mar. 25, 2013.

Final Office Action for U.S. Appl. No. 12/396,259 mailed Aug. 8, 2012.

Notice of Allowance for U.S. Appl. No. 12/396,259 mailed Mar. 13, 2013.

Non-final Office Action for U.S. Appl. No. 12/396,265 mailed Jan. 4, 2011.

(56) References Cited

OTHER PUBLICATIONS

Non-final Office Action for U.S. Appl. No. 12/396,241 mailed Apr. 14, 2011.
Final Office Action for U.S. Appl. No. 12/396,265 mailed Apr. 15, 2011.
Non-final Office Action for U.S. Appl. No. 12/396,261 mailed Apr. 26, 2011.
Non-final Office Action for U.S. Appl. No. 12/396,259 mailed Apr. 27, 2011.
Non-final Office Action for U.S. Appl. No. 12/396,268 mailed May 3, 2011.
Non-final Office Action for U.S. Appl. No. 12/396,255 mailed May 23, 2011.
Non-final Office Action for U.S. Appl. No. 12/396,240 mailed May 25, 2011.
Non-final Office Action for U.S. Appl. No. 12/396,258 mailed Jun. 8, 2011.
Notice of Allowance for U.S. Appl. No. 12/396,248 mailed Dec. 3, 2013.

* cited by examiner

SYSTEMS, METHODS, AND DEVICES FOR PROCESSING FEEDBACK INFORMATION RECEIVED FROM MOBILE DEVICES RESPONDING TO TONE TRANSMISSIONS

CROSS-REFERENCE TO RELATED APPLICATIONS

This application is related to U.S. patent application Ser. No. 12/396,241 filed Mar. 2, 2009 and entitled "Systems, Methods, and Devices for Administering Consumer Rewards Programs Through the Use of Tones Sent to Mobile Devices"; U.S. patent application Ser. No. 12/396,258 filed Mar. 2, 2009 and entitled "Systems, Methods, and Apparatus for Providing Promotion Information to a Mobile Device"; U.S. patent application Ser. No. 12/396,240 filed Mar. 2, 2009 and entitled "Systems, Methods, and Apparatus for Marketing by Communicating Tones to a Mobile Device"; U.S. patent application Ser. No. 12/396,255 filed Mar. 2, 2009 and entitled "Systems, Methods, and Apparatus for Communicating Information to a Mobile Device in a Broadcast Signal"; U.S. patent application Ser. No. 12/396,261 filed Mar. 2, 2009 and entitled "Systems, Methods, and Apparatus for Facilitating Communication Between Mobile Devices"; U.S. patent application Ser. No. 12/396,248 filed Mar. 2, 2009 and entitled "Systems, Methods, and Devices for Prompting Mobile Device Users for Feedback Information Using Tone Transmissions"; U.S. patent application Ser. No. 12/396,265 filed Mar. 2, 2009 and entitled "Systems, Methods, and Apparatus for Facilitating Transactions Using a Mobile Device"; U.S. patent application Ser. No. 12/396,242 filed Mar. 2, 2009 and entitled "Systems, Methods, and Apparatus for Providing Terms and Conditions and Program Enrollment Information to a Mobile Device"; U.S. patent application Ser. No. 12/396,256 filed Mar. 2, 2009 and entitled "Systems, Methods, and Devices for Communicating Supplemental Information to Mobile Devices"; U.S. patent application Ser. No. 12/396,268 filed Mar. 2, 2009 and entitled "Systems, Methods, and Apparatus for Receiving Information by a Mobile Device"; U.S. patent application Ser. No. 12/396,271 filed Mar. 2, 2009 and entitled "Systems, Methods, and Apparatus for Providing Information to a Mobile Device"; and U.S. patent application Ser. No. 12/396,259 filed Mar. 2, 2009 and entitled "Systems, Methods, and Apparatus for Receiving Promotion Information by a Mobile Device". Each of these applications is incorporated by reference herein in its entirety.

FIELD OF THE INVENTION

Embodiments of the invention relate generally to mobile devices, and more particularly to systems, methods, and devices for processing feedback information received from mobile devices responding to tone transmissions.

BACKGROUND OF THE INVENTION

Marketers, consumer product or service companies, and media content providers, often track the trends, interests, and/or preferences of consumers to make decisions about programming, advertising placement in various forms of media, product and/or service features to be included in new or updated products or services, or points of emphasis in an advertisement or packaging based on consumer preferences. Marketers, consumer product companies, and the like obtain this information from various sources including television and/or radio ratings, search engine companies, such as Google, various third party advertising agencies and services, etc. Often this information is obtained through various surveys, consumer feedback through suggestions, complaints, etc., as well as more sophisticated processes including Nielsen ratings, and statistical information obtained through online marketplaces such as iTunes, etc.

However, the cost and implementation associated with conventional ways to monitor consumer's preferences, interests, tastes, and trends can be significant, and the information obtained is often skewed by the means used to obtain the information, which may require significant interaction with a consumer, or may require a delay to process the information such that the information may be considered stale or outdated information shortly after being compiled or inaccurate due to many consumers' unwillingness to participate in providing user feedback information.

Therefore, a need exists in the art for systems, methods, and apparatus for addressing some or all of the shortcomings and limitations of existing marketing communication techniques.

SUMMARY OF THE INVENTION

Some or all of the above needs and/or problems may be addressed by certain embodiments of the invention. In an example embodiment of the invention, there is a system that includes a memory for storing computer-executable instructions, and an information source processor in communication with the memory, wherein the processor is configured to execute the computer-executable instructions to associate a location identifier with user prompting information and transmit the location identifier to a tone transmission device, where the location identifier is embedded in a tone. The processor is further configured to execute the computer-executable instructions to receive the location identifier that was sent from a mobile device that received the tone from the tone transmission device, retrieve, from the memory, user prompting information based on the location identifier, and transmit the user prompting information to the mobile device.

In accordance with another embodiment of the invention, there is a method that includes an information source processor associating a location identifier with user prompting information stored in a memory, and transmitting the location identifier to a tone transmission device, where the location identifier is embedded in a tone. The method further includes the information source receiving the location identifier, where the location identifier was sent from a mobile device that received the tone from the tone transmission device, retrieving, from the memory, user prompting information based on at least the location identifier, and transmitting the user prompting information to the mobile device.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
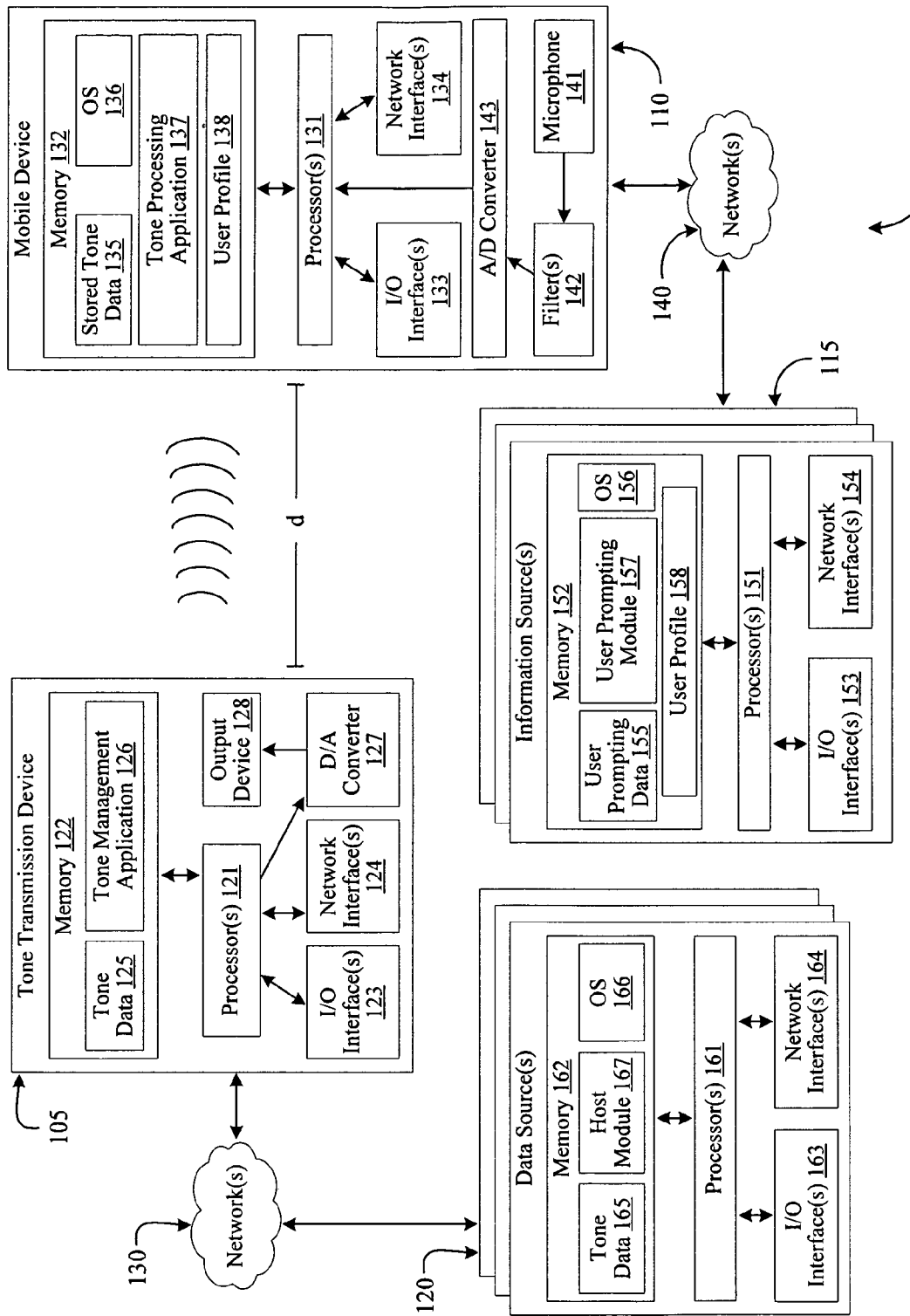

Having thus described the invention in general terms, reference will now be made to the accompanying drawings, which are not necessarily drawn to scale, and wherein:

FIG. 1 is a schematic diagram of one example system that may facilitate the communication of user prompting information to a mobile device and receiving feedback information from the mobile device, according to an illustrative embodiment of the invention.

Figure 2:
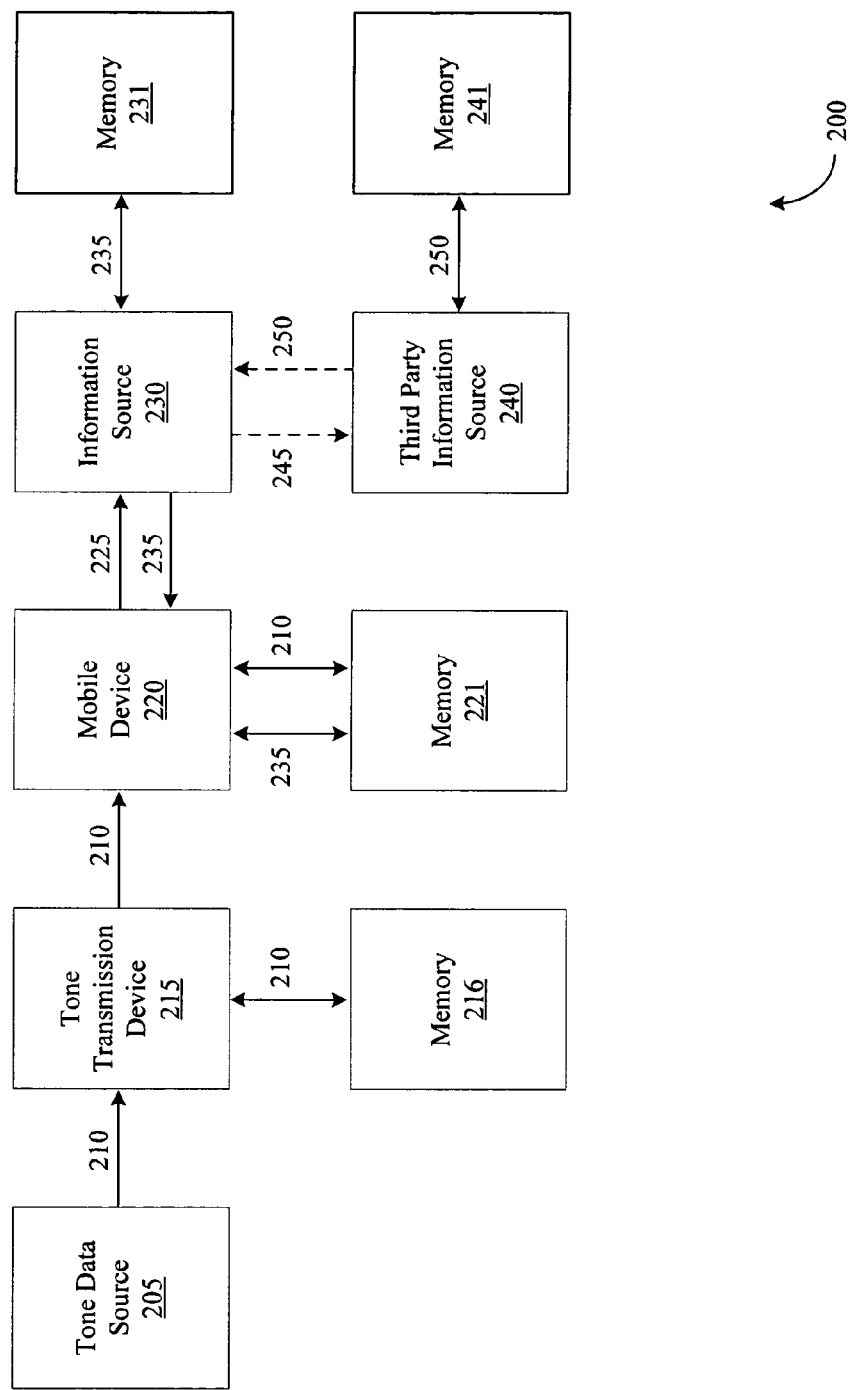

FIG. 2 is a diagram of one example data flow 200 of transmitting an information carrying tone and retrieving user prompting information associated with the tone, according to an illustrative embodiment of the invention.

Figure 3:
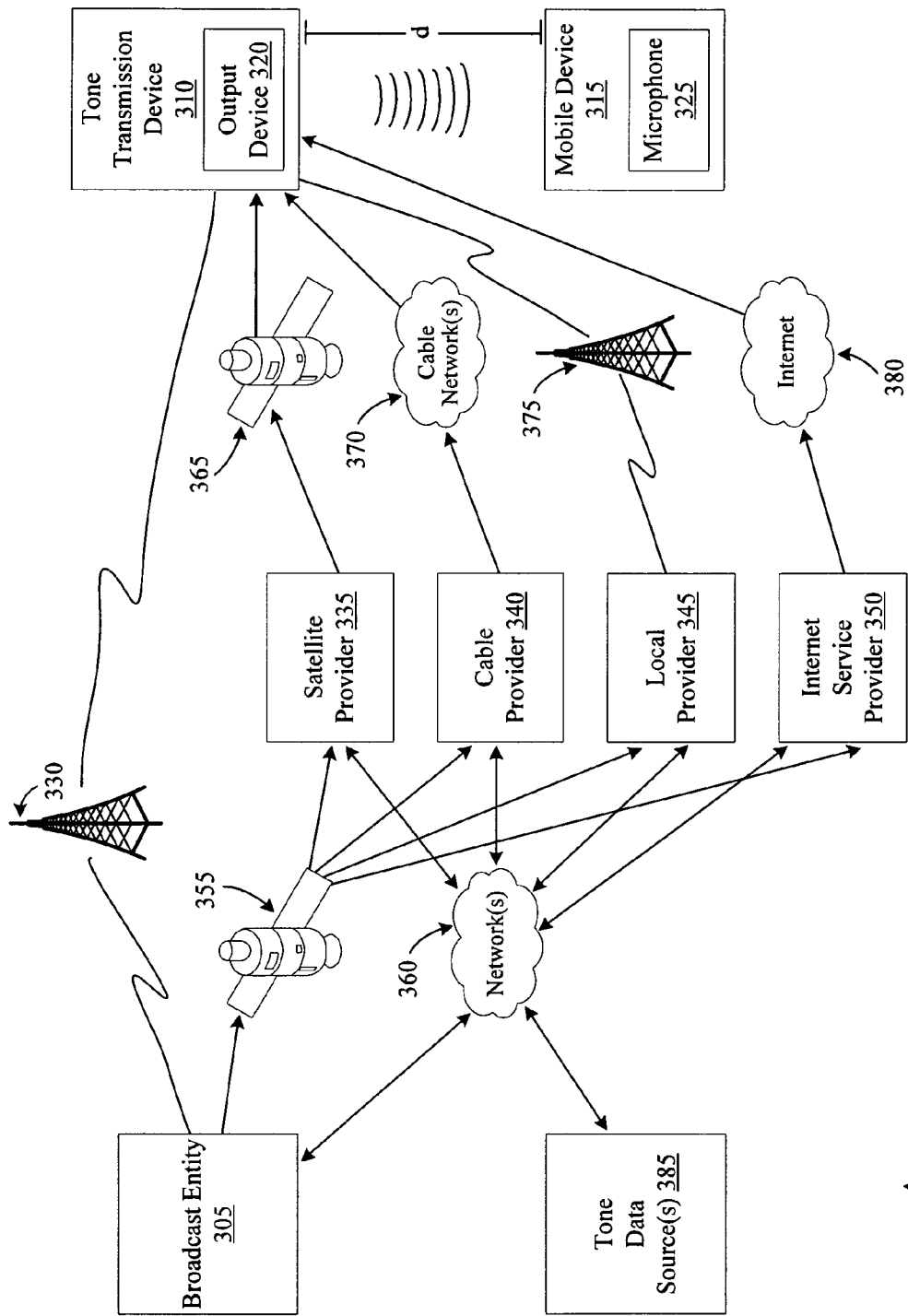

FIG. 3 is a schematic diagram of yet another example system that may facilitate the communication of tones to a mobile device, according to an illustrative embodiment of the invention.

Figure 4:
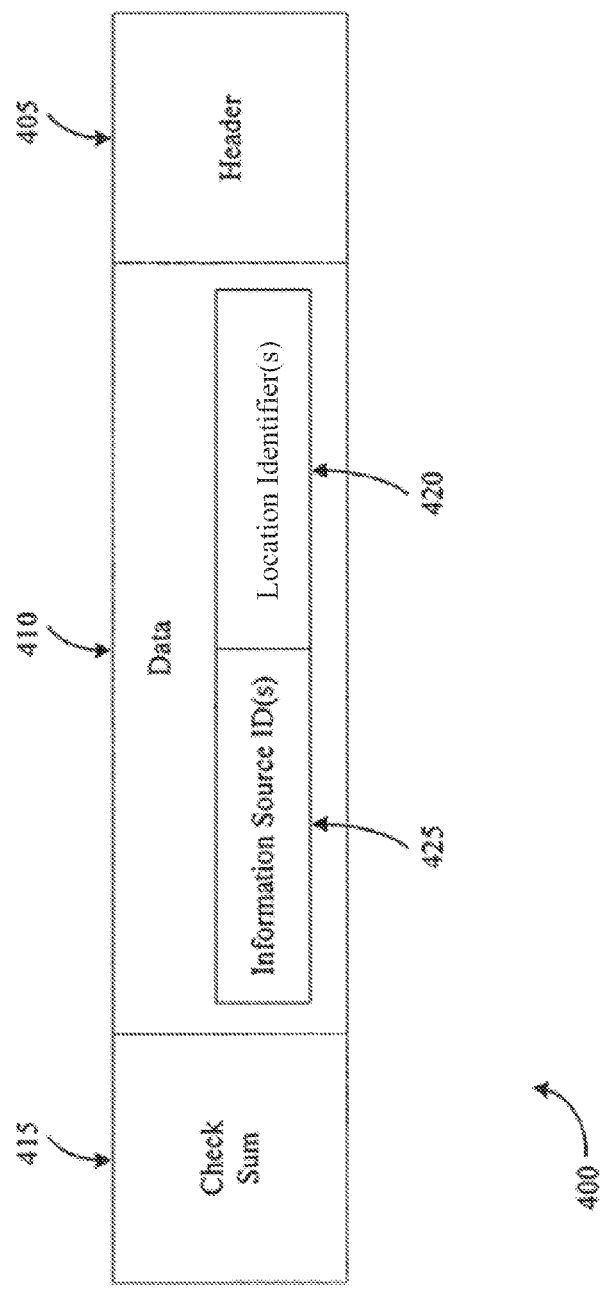

FIG. 4 is a block diagram of data that may be included in an example tone, according to an illustrative embodiment of the invention.

Figure 5:
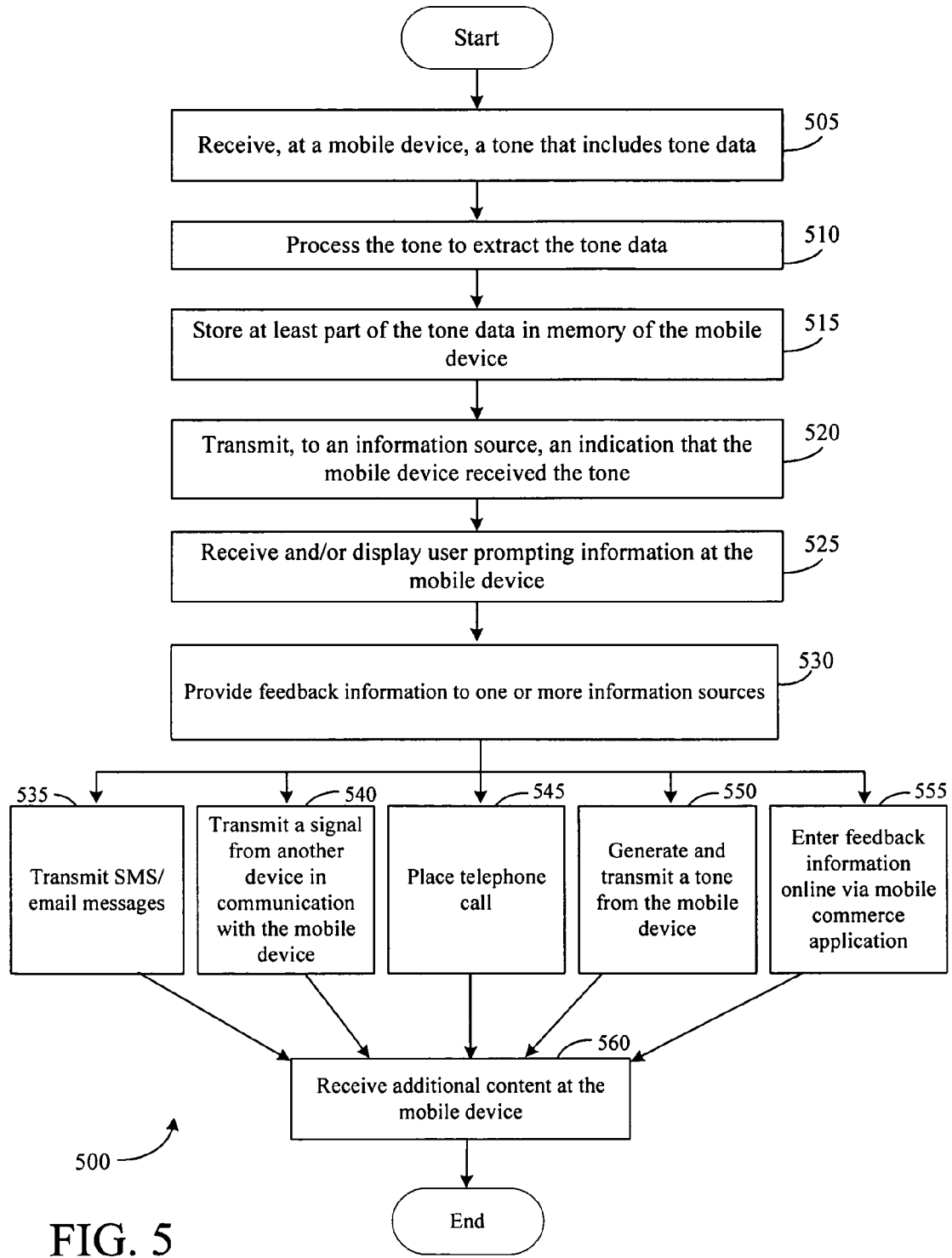

FIG. 5 is a flowchart of one example method 500 for receiving information carrying tones at a mobile device, subsequent processing of the tone data by the mobile device, and/or providing feedback information from a mobile device, according to an illustrative embodiment of the invention.

Figure 6:
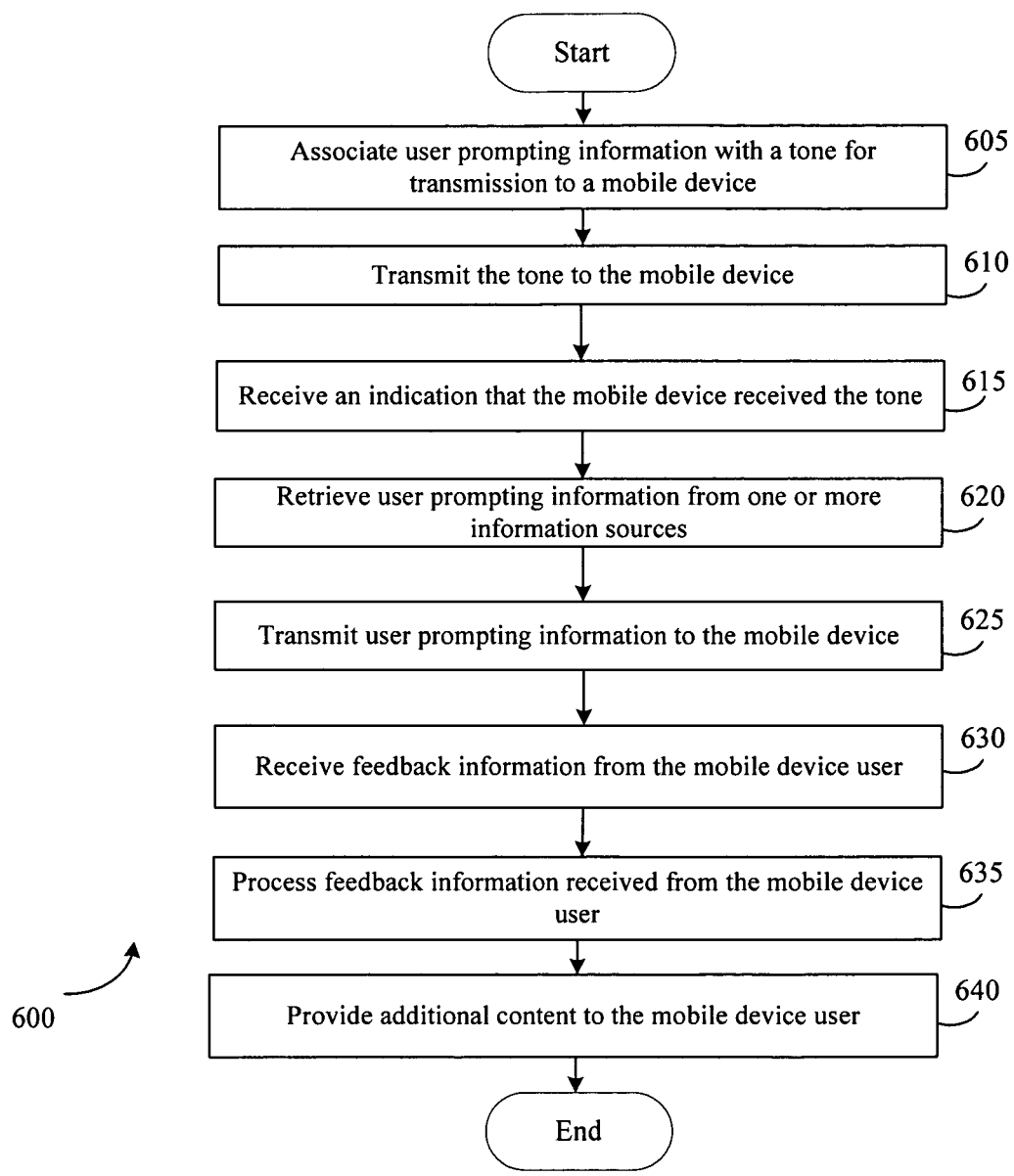

FIG. 6 is a flow chart of one example method for processing user prompting information and/or feedback information at an information source, according to an illustrative embodiment of the invention.

Figure 7:
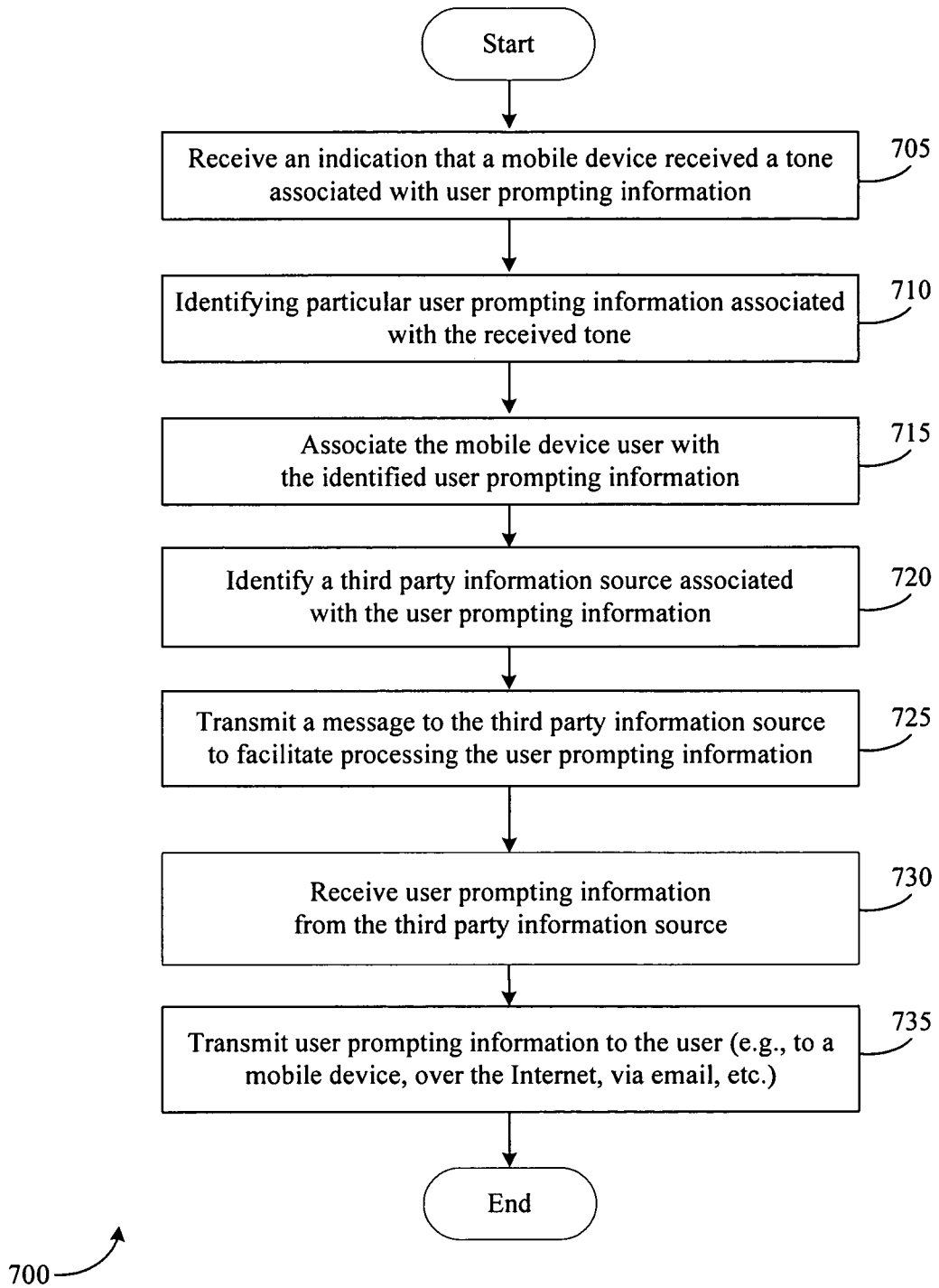

FIG. 7 is a flow chart of one example method for processing user prompting information and/or user feedback information with multiple information sources, according to an illustrative embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention are directed to systems, methods, and apparatus for transmitting user prompting information to, mobile device operators (also referred to interchangeably herein as "users" or "mobile device users") and/or receiving feedback information from mobile device operators. The widespread use of mobile devices, such as cellular phones or smart phones, provides a new and effective channel to reach potential customers to transmit information, such as user prompting information. Moreover, mobile devices provide a relatively simple and convenient means from which to receive additional information and/or receive feedback information from consumers, as well as automatically monitor downstream activities (e.g., consumer behavior, preferences, purchases, etc.) tied to the feedback information transmitted from the mobile devices.

The term "user prompting information" is used herein to generally refer to user interface information such as prompts, inquiries, pre-set user interfaces, etc. to request feedback information from a mobile device user. Various types of user prompting information may include user interfaces, prompts, and/or inquiries for voting information (e.g., game show or reality television real time voting interfaces, product or brand voting interfaces, and/or the like), rating information (e.g., interfaces for rating or ranking products, television show content, radio content, etc., surveys, consumer comment interfaces, and/or the like), content selection information (e.g., interfaces for selecting between items, and/or the like), user preference information (e.g., interfaces that include prompts or inquiries relating to a user's preferences, account information, and/or the like). The term "user prompting information" may include location identifiers to identify, reference, or point to a memory location or block of memory (e.g., a database at an information source) at which user prompting information associated with the tone is stored. In some embodiments of the invention, a location identifier may include hyperlink or other web address information. The term "feedback information" may be any information (e.g., data selections, data entry, etc.) provided to one or more information sources by the mobile device user in response to receiving the user prompting information. Various types of feedback information may corresponding to the various types of user prompting information and therefore may include user-specific voting information, rating information, content selection information, and/or user preference information provided by the mobile device user.

As used herein, the term "tone" may refer to a tone carrying information that may be communicated or transmitted to a mobile device by a tone transmission device. The terms "tone" and "information carrying tone" may be used interchangeably herein. A wide variety of methods and/or techniques may be utilized to facilitate the communication of a tone from a tone transmission device to a mobile device. In certain embodiments of the invention, a tone may be output by one or more suitable output devices associated with the tone transmission device, for example, one or more speakers, and the tone may be received by one or more suitable input devices associated with the mobile device, for example, a microphone. A tone may be a wave, such as an elastic wave, a primary wave or P-wave, that is propagated between the tone transmission device and the mobile device. In certain embodiments of the invention, a tone may be a vibration wave that is propagated though a solid, liquid, or gas. For example, in various embodiments of the invention, a tone may be a sound wave that is emitted or otherwise output by the tone transmission device for reception by a mobile device. Tones in accordance with embodiments of the invention may have a wide variety of different frequencies and/or amplitudes as desired. For example, in some embodiments, a tone may be a sound wave that is within a range that may be detected by the human ear, for example, a sound wave with a frequency between approximately 20 hertz and approximately 20 kilohertz. In such an example embodiment of the invention, it may be desirable to have the tone be produced at a frequency range that is not detectable by the naked ear for at least a significant portion of the human population (e.g., a frequency range of 17 kilohertz-20 kilohertz). In other embodiments, a tone may be a sound wave that is outside the normal range that may be detected by the human ear, for example, a sound wave with a frequency above approximately 21 kilohertz. In these embodiments, a tone may be transmitted to a mobile device without being aurally detected by a user of the mobile device. Once received, the tone may be processed by the mobile device to extract the information included in the tone. Information embedded in or otherwise carried by the tone can include user prompting information such as one or more location identifiers, as described in more detail with reference to FIG. 4.

As used herein, the term "tone transmission device" may be any device, system, apparatus, or combination thereof that facilitates the communication of a tone to a mobile device. A tone transmission device may facilitate user prompting information messaging by communicating tones to a mobile device that are associated with various types of user prompting information. Additionally, for purposes of this disclosure, the terms "tone transmission device" and "tone transmission system" may be used interchangeably. Examples of tone transmission devices include, but are not limited to, devices that are situated within a poster, billboard, etc., devices that are situated within a retail location (e.g., devices situated on the shelves of a grocery store, point of sale terminals, etc.), radios, televisions, computers, projectors, mobile devices, speaker systems, public broadcast systems, public announcement system, etc. Some example tone transmission devices and tone transmission systems are discussed in greater detail below.

As used herein, the term "mobile device" may refer to any mobile device that is operable to receive a tone from a tone transmission device. Mobile devices may be devices that are carried by a target user and information, such as user prompting information, may be communicated to the user via the mobile devices. Examples of mobile devices include, but are not limited to, cellular phones, iPhones, smart phones, personal digital assistants (PDA's), pagers, digital audio players, handheld portable computing devices, digital tablets, laptop computers, etc. Additionally, for purposes of this disclosure, the terms "mobile device," "mobile communications device," "mobile phone," "cellular phone," and "cell phone" may be used interchangeably.

Various embodiments described herein may include receiving user prompting information on a mobile device and/or receiving feedback information from the mobile device user in response to receiving the user prompting information. According to one embodiment, the transmission of user prompting information may be initiated by communicating a tone, such as an information carrying tone, to a mobile device, whereby the tone includes a location identifier that is associated with user prompting information. In addition, embodiments may further include transmitting via the mobile device a user's responses and/or input to the mobile device (e.g., feedback information), which may be further processed by one or more information source entities, such as a back-end processor (also referred to herein as an "information source" or "information source processor") capable of maintaining location identifiers and associated user prompting information, user profiles (e.g., consumer account information, user preferences, etc.), and/or feedback information.

Various tone transmission devices may be operable to transmit information carrying tones with user prompting information, such as a television transmitting audiovisual content including an information carrying tone, a radio transmitter transmitting radio content including an information carrying tone, internet data transmissions including an information carrying tone, or a stand-alone tone generation device having the primary purpose to generate and/or transmit information carrying tones, such as may be used in retail displays or other advertisement displays.

For example, while watching a television broadcast, such as an advertisement, a message may be played that indicates feedback information may be requested from the viewer via the viewer's mobile device. The message may indicate that if the viewer elects to receive an information carrying tone being broadcast through the television they may receive user prompting information (e.g., location identifiers associated with user prompting information) to enter requested feedback information. Thus, if a viewer so chooses, upon receiving the information carrying tone by the mobile device, the mobile device may then communicate with a back-end processor to receive user prompting information for presentation to the mobile device user to allow the mobile device user to provide feedback information.

Upon receiving an information carrying tone by the mobile device, the mobile device and associated applications can perform processing to extract the user prompting information carried by the tone. In example embodiments, the tone may include at least one location identifier or other unique identifier that is associated by a back-end processing system with additional user prompting information. Thus, in response to extracting the location identifier from the tone, the mobile device may transmit a request to another system, such as a back-end processor, merchant, marketer, service provider, financial institution, or other entity to receive user prompting information associated with the location identifier and/or other information that entity wants to present to the mobile device user. The location identifier or other unique identifier may facilitate the back-end processor or other entity to identify the associated user prompting information and/or perform additional processing. In one example embodiment, the user may provide input to the mobile device, such as whether the user wishes to provide feedback information relating to the content associated with the tone such as television content or an advertised product or service, or whether the user wishes to obtain user prompting information to provide feedback information regarding the content or advertised product or service.

One or more entities can facilitate the generation, retrieval, transmission, processing, and management of user prompting information using the information carrying tones and/or the processing and management of feedback information received from the mobile device user in response to the user prompting information. For example, a central information source, such as a back-end processor, may create tones and associate location identifiers and/or user prompting information therewith. A central information source may also facilitate the transmission of information carrying tones and location identifiers, such as by coordinating with a television or radio broadcaster or by providing standalone tone transmission devices at merchants or with other marketing media. In some embodiments, a central information source may interact with one or more third party entities, such as merchants, service providers, marketers, and/or the like. For example, a central information source may communicate with a third party entity (also referred to interchangeably herein as a "third party information source"), sending information received from a mobile device in association with an information carrying tone, or requesting information to send to a mobile device. Examples of a central information source or central service provider may include a mobile service provider system, or a system or entity associated with a tone processing application utilized by the mobile device. For example, First Data Corporation™ may provide a central information source that receives and processes requests for user prompting information and/or feedback information received from mobile devices. Examples of suitable platforms that may be utilized include, but are not limited to, the First Data Mobile Gateway Platform and the First Data Size Platform.

A wide variety of different systems may be utilized as desired in various embodiments of the invention to communicate information to a mobile device and receive response information from the mobile device. A few example system are discussed below with reference to FIGS. 1-7.

FIG. 1 is a schematic diagram of one example system that may facilitate the communication of user prompting information to a mobile device and receiving feedback information from the mobile device, according to an illustrative embodiment of the invention. The system 100 may be utilized to facilitate the communication of a wide variety of different information to a mobile device 110 through the use of communicating one or more tones to the mobile device 110. The system 100 may include a tone transmission device 105, a mobile device 110, and one or more information sources 115.

The tone transmission device 105 may be any suitable or appropriate device or system that facilitates the communication of a tone to a mobile device 110. In this regard, the tone transmission device 105 may facilitate communicating user prompting information to mobile devices. The tone transmission device 105 may be situated or placed in a wide variety of different locations or environments as desired in various embodiments of the invention. For example, the tone transmission device 105 may be incorporated into or situated proximate to a poster, billboard, sign, or other advertisement. The tone output by the tone transmission device 105 may be associated with a product or service that is referenced by the poster, billboard, sign, or other advertisement. As another example, the tone transmission device 105 may be situated at a merchant location, such as, a retail establishment. The tone transmission device 105 may be incorporated into or situated proximate to one or more products at the merchant location. For example, the tone transmission device 105 may be located on a shelf at the merchant location next to a product associated with a tone that is output by the tone transmission device 105 or the tone transmission device 105 may be located next to or incorporated into a cashier's station or kiosk inside the merchant location. As another example, the tone transmission device 105 may be a speaker system, public announcement system, or public broadcasting system that is situated within a merchant location, a sporting venue, or other location. As another example, the tone transmission device 105 may be any conventional television, radio, computer, or projector operable to transmit content, such as video and/or audio content, as further described with reference to FIG. 3. As yet another example, the tone transmission device 105 may be a mobile device that is operable to communicate a tone to another mobile device 110. As another example, the tone transmission device 105 may be a portable audio device (e.g., iPod, portable radio, etc.), a radio, a television, or other device that is capable of outputting a tone.

In certain embodiments of the invention, the size and/or dimensions of the tone transmission device 105 may be based at least in part on the application of the tone transmission device 105. For example, if the tone transmission device 105 is incorporated into a poster, the tone transmission device 105 may have relatively small dimensions that facilitate its incorporation into the poster. As another example, a tone transmission device 105 that is situated on or near a shelf at a merchant location may have relatively small dimensions. For example, the tone transmission device 105 may have a size that is smaller than or approximately equal to that of a conventional coupon holder. In yet another example, the tone transmission device 105 may be any conventional television, radio, computer, or projector, as further described with reference to FIG. 3. Additionally, the tone transmission device 105 may utilize a wide variety of different power sources as desired in various embodiments of the invention, for example, battery power, a direct current power source, an alternating current power source, or a network provided power source (e.g., power provided via a telephone line).

The tone transmission device 105 may be a processor driven device that facilitates the outputting and communication of a tone that may be received by a mobile device 110. For example, the tone transmission device 105 may include any number of special purpose computers or other particular machines, application specific circuits, microcontrollers, personal computers, minicomputers, and/or the like. In certain embodiments, the operations of the tone transmission device 105 may be controlled by computer-executed or computer-implemented instructions that are executed by one or more processors associated with the tone transmission device 105. The instructions may be embodied in one or more software components as desired in various embodiments of the invention. The execution of the instructions may form a special purpose computer or other particular machine that is operable to communicate a tone to a mobile device 110. The one or more processors that control the operations of the tone transmission device 105 may be incorporated into the tone transmission device 105 and/or in communication with the tone transmission device 105 via one or more suitable networks. In certain embodiments of the invention, the operations and/or control of the tone transmission device 105 may be distributed amongst several processing components.

The tone transmission device 105 may include one or more processors 121, one or more memory devices 122, one or more input/output (I/O) interface(s) 123, and one or more network interface(s) 124. The one or more memory devices 122 may be any suitable memory devices, for example, caches, read only memory devices, random access memory devices, magnetic storage devices, etc. The one or more memory devices 122 may store data, executable instructions, and/or various program modules utilized by the tone transmission device 105, for example, tone data 125 and/or a tone management application 126. The tone data 125 may include stored data associated with a tone that is output by the tone transmission device. In an example embodiment of the invention, tone data may include user prompting information and/or one or more location identifiers associated with user prompting information that may make up a portion of the data carried by the tone (e.g., the tone payload). In other example embodiments of the invention, the tone data may include stored digital data associated with a tone, such as, a Waveform audio format (WAV) file, MPEG-1 Audio Layer 3 (MP3) file, Moving Picture Experts Group (MPEG) file, Audio Interchange File Format (AIFF) file, Advanced Audio Coding (AAC) file, Apple Lossless file, or other digital media file format. As another example, the tone data may include stored analog data associated with a tone, for example, magnetically stored analog data. Additionally, in certain embodiments of the invention, data associated with a tone may be received by the tone transmission device 105 and output by the tone transmission device 105 without being stored in one or more memory devices 122. Thus, in some embodiments of the invention the tone transmission device 105 does not include the one or more memory devices 122.

In certain embodiments of the invention, the tone transmission device 105 may include a tone management application 126. The tone management application 126 may include computer-executable instructions that facilitate the management of one or more tones by the tone transmission device 105. For example, the tone management application 126 may facilitate and/or control the receipt of tone data or other information associated with a tone, the generation of tone data, the storage of tone data, the accessing of stored tone data, the conversion of tone data into a form that may be output by the tone transmission device 105, and/or the output of a tone by the tone transmission device 105. In certain embodiments, the conversion of tone data into a form that may be output by the tone transmission device 105 may transform digital tone data into analog data that may be output by one or more suitable output devices, for example, one or more speakers. In certain embodiments of the invention, the tone management application 126 may also facilitate and/or control network communication between the tone transmission device 105 and one or more external devices, such as, one or more data sources 120. Although the tone management application 126 is illustrated as a single software component, the tone management application 126 may include any number of software components, modules, and/or applications as desired in various embodiments of the invention.

The one or more I/O interfaces 123 may facilitate communication between the tone transmission device 105 and one or more input/output devices, for example, a universal serial bus port, a serial port, a disk drive, a CD-ROM drive, infrared receiver, and/or one or more user interface devices, such as, a display, keyboard, keypad, mouse, control panel, touch screen display, remote control, microphone, etc. that facilitate user interaction with the tone transmission device 105. The one or more I/O interfaces may be utilized to receive or collect tone data from a wide variety of input devices. For example, tone data may be received from a portable memory device (e.g., thumb drive, portable hard drive, etc.) via the one or more I/O interfaces. Following receipt of the tone data via the one or more I/O interfaces, the received tone data may be processed by the tone management application 126 and stored in a memory device 122 associated with the tone transmission device 105. Additionally, in certain embodiments, the one or more I/O interfaces may be utilized to receive user input from a user of the tone transmission device 105, for example, a programmer of the tone transmission device 105. In this regard, one or more user preferences associated with the operation of the tone transmission device 105 may be received and processed. In certain embodiments of the invention, user input may be received by the tone transmission device 105 indicating a desire to have a tone output by the tone transmission device 105. For example, a user may press a button or activate a sensor associated with a tone transmission device 105, thereby causing the tone transmission device to output a tone.

The one or more network interfaces 124 may facilitate connection of the tone transmission device 105 to one or more suitable networks 130, for example, a local area network, a wide area network, the Internet, a telephone network, a broadcast network, a cellular network, a Bluetooth enabled network, a Wi-Fi network, a radio frequency network, any wired network, any wireless network, etc. In this regard, the tone transmission device 105 may receive tone data and/or user input from one or more external devices, network components, and/or systems via the one or more networks 130. For example, the tone transmission device 105 may receive tone data from one or more data sources 120 via the one or more networks 130. As one example, if the tone transmission device 105 is located at a merchant location, then the tone transmission device 105 may receive tone data from one or more data sources 120 located at the merchant location via a local area network. As another example, if the tone transmission device 105 is a television, then the tone transmission device 105 may receive tone data in association with a television signal, transmission, or broadcast received via a suitable television network (e.g., broadcast, cable, satellite, IP television, Internet, etc.). As yet another example, if the tone transmission device 105 is a radio, then the tone transmission device 105 may receive tone data in association with a radio signal, transmission, or broadcast via a suitable radio network (e.g., broadcast, satellite, Internet, etc.). As yet another example, if the tone transmission device 105 is a mobile device, then the tone transmission device 105 may receive tone data via communication over a cellular network or via an Internet connection.

According to an aspect of the invention, the tone transmission device 105 may output a tone for receipt by a mobile device 110. The tone transmission device 105 may output the tone via one or more suitable output devices 128, for example, one or more speakers. In certain embodiments of the invention, the tone management application 126 may direct and/or control the access of stored tone data 125 and the processing of the accessed tone data 125 to derive the tone that is output by the one or more output devices 128. For example, digital tone data 125 may be accessed from memory 122 and processed through a digital-to-analog converter 127 to derive the tone that is output by the one or more output devices 128. In this regard, the stored tone data 125 may be transformed into a tone that may be output by the tone transmission device 105 for receipt by a mobile device. In other embodiments of the invention, the tone transmission device 105 may receive tone data in a broadcast stream, such as a radio or television broadcast stream, and the tone transmission device may output the tone data as a tone in the audio output of the tone transmission device 105. For example, a television broadcast signal may include embedded tone information that is output by one or more speakers of a television as part of the audio output of the received television broadcast signal.

Embodiments of the invention may include tone transmission devices with more or less than the components illustrated for the tone transmission device 105 illustrated in FIG. 1. The description of the tone transmission device 105 of FIG. 1 is provided by way of example only and is not intended to be limiting.

With continued reference to FIG. 1, the mobile device 110 may be any suitable or appropriate device or system that facilitates the receipt of a tone from a tone transmission device 105 and the processing of the received tone. In this regard, the mobile device 110 may receive user prompting information (e.g., one or more location identifiers that reference user prompting information associated with the tone) through the receipt of one or more tones. The mobile device 110 may facilitate the receipt of tones from any number of tone transmission devices 105 in a wide variety of different locations or environments as desired in various embodiments of the invention. Once a tone is received by the mobile device 110, the tone may be processed by the mobile device 110 to extract information included in the tone, such as, one or more location identifiers that reference user prompting information associated with the tone. The extracted information may be utilized to access one or more information sources 115 to obtain at least a portion of the user prompting information associated with the tone.

Tones may be associated with a wide variety of different types of user prompting information that may be accessed by the mobile device 110 from one or more information sources 115. In example embodiments of the invention, user prompting information that may be associated with tones may include, but is not limited to, one or more user interfaces containing one or more prompts for voting information, rating information, content selection information, user preference information, and/or the like. Additionally, information extracted from a tone may facilitate the connection of the mobile device 110 to a website or other network site for a wide variety of purposes, including but not limited to, retrieving user prompting information for displaying to the mobile device user (e.g., user interfaces including one or more prompts for voting information, rating information, content selection information, user preference information, and/or the like). The mobile device user may then enter or otherwise provide feedback information to one or more information sources in response to the receipt of user prompting information at the mobile device, as is discussed in more detail with reference to FIGS. 5-6 below.

The mobile device 110 may be a processor driven device that facilitates the receipt of tones from tone transmission devices 105 and the processing of the received tones. For example, the mobile device 110 may include any number of special purpose computers or other particular machines, application specific circuits, microcontrollers, and/or the like. In certain embodiments, at least a portion of the operations of the mobile device 110 may be controlled by computer-executed or computer-implemented instructions that are executed by one or more processors associated with the mobile device 110. The instructions may be embodied in one or more software components as desired in various embodiments of the invention. The execution of the instructions may form a special purpose computer or other particular machine that is operable to receive and process tones. Additionally, in certain embodiments of the invention, the operations and/or control of the mobile device 110 may be distributed amongst several processing components.

The mobile device 110 may include one or more processors 131, one or more memory devices 132, one or more input/output (I/O) interface(s) 133, and one or more network interface(s) 134. The one or more memory devices 132 may be any suitable memory devices, for example, caches, read only memory devices, random access memory devices, magnetic storage devices, etc. The one or more memory devices 132 may store data, executable instructions, and/or various program modules utilized by the mobile device 110, for example, stored tone data 135 that is received by the mobile device 110, an operating system 136, a tone processing application 137, and/or a user profile 138. The stored tone data 135 may include user prompting information associated with and/or extracted from one or more tones that are received by the mobile device 110 and/or previously created feedback information. For example, the stored tone data 135 may include one or more location identifiers that are extracted from received tones. As another example, the stored tone data 135 may include user prompting information associated with tones that is received from one or more information sources 115.

In certain embodiments of the invention, the mobile device 110 may include one or more software modules, such as an operating system 136 and/or a tone processing application 137. The operating system 136 may control the general operation of the mobile device 110, for example, the completion of telephone calls, the maintenance of an address book, the accessing of the Internet via a mobile browser application, etc. The operating system 136 may also facilitate the execution of other software modules by the one or more processors 131, for example, the tone processing application 137. The tone processing application 137 may include computer-executable instructions that facilitate the receipt and processing of one or more tones by the mobile device 110. For example, the tone processing application 137 may facilitate and/or control the receipt of tones from one or more tone transmission devices 105, the processing of received tones to extract user prompting information such as one or more location identifiers associated with the tones, the communication of requests for user prompting information associated with a tone from one or more information sources 115, the receipt of user prompting information from one or more information sources 115, the processing of received user prompting information, the storage of received user prompting information, and/or the subsequent access and/or processing of stored user prompting information. In certain embodiments of the invention, the tone processing application 137 may also facilitate and/or control network communication between the mobile device 110 and one or more external devices, such as, one or more information sources 115. Although the tone processing application 137 is illustrated as a single software component, the tone processing application 137 may include any number of software components, modules, and/or applications as desired in various embodiments of the invention.

The user profile 138 may include one or more preferences and/or other information associated with one or more users of the mobile device 110. In certain embodiments, the user profile 138 may include one or more user preferences associated with types of desired tones (e.g., tones carrying user prompting information such as location identifiers) and/or user prompting information that may be received and processed by the mobile device 110. For example, the user profile 138 may include preferences indicating that certain tones and/or user prompting information should be or should not be received and/or processed by the mobile device 110. In this regard, tones and/or user prompting information may be filtered by the mobile device 110. A wide variety of different preferences and/or criteria may be utilized as desired in various embodiments, including but not limited to, merchant criteria, merchant class or merchant type criteria, broadcaster criteria, marketing source criteria, etc. As another example, the user profile 138 may include one or more preferences associated with the manner in which tones and/or user prompting information should be processed by the mobile device 110. Moreover, according to one embodiment, the user profile 138 may include information (e.g., identifying information, user-specific feedback information, etc.) associated with the user of the mobile device 110, such as, but not limited to, name information, username, account information, passwords, personal identification numbers (PINs), user preference information, user-specific voting information, user-specific rating information, user-specific content selection information, and/or the like. In example embodiments of the invention, the user profile 138 of the mobile device 110 may store identifying information associated with the mobile device, such as a mobile device number, universal integrated circuit card (UICC) identifier, a unique device identifier (UDID), subscriber identity module (SIM) card identifier, or international mobile subscriber identity (IMSI) number, or identifying information associated with the mobile device user, such as an email address, identification number, home address, area code, zip code, phone number, and/or other information associated with the mobile device and/or mobile device user that would be useful in user prompting information and/or feedback processing. In some embodiments of the invention, the information stored in the user profile 138 may be used to automatically provide feedback information in response to user prompting information received by the mobile device 110.

The one or more I/O interfaces 133 may facilitate communication between the mobile device 110 and one or more input/output devices, for example, one or more user interface devices, such as, a display, keypad, control panel, touch screen display, remote control, microphone, etc. that facilitate user interaction with the mobile device 110. In this regard, one or more user preferences associated with the operation of the mobile device 110 may be received, stored, and/or processed and/or feedback information associated with received user prompting information may be received, stored, and/or processed.

The one or more network interfaces 134 may facilitate connection of the mobile device 110 to one or more suitable networks 140, for example, a cellular network, a local area network, a wide area network, the Internet, a Bluetooth enabled network, a Wi-Fi network, a radio frequency network, any wired network, any wireless network, etc. In this regard, the mobile device 110 may receive user prompting information or data associated with tones from one or more external devices, network components, and/or systems via the one or more networks 140. The mobile device 110 may then process the received user prompting information and communicate with the one or more external devices, network components, and/or systems via the one or more networks 140. For example, the mobile device 110 may receive a tone from a tone transmission device 105 and extract one or more location identifiers from the received tone. The mobile device 110 may utilize the one or more extracted location identifiers to access one or more information sources 115 via a cellular network or mobile Internet browser and receive user prompting information associated with the tone. The mobile device 110 may utilize a wide variety of different techniques, methods, and/or systems to communicate with the one or more information sources 115. For example, a mobile Internet browser or other specific purpose or dedicated application may facilitate communication between the mobile device 110 and the one or more information sources 115. As another example, short message service (SMS) communications may be utilized to facilitate communication between the mobile device 110 and the one or more information sources 115.

According to an example embodiment of the invention, the mobile device 110 may receive and process one or more tones from any number of tone transmission devices 105. A tone may be output by a tone transmission device 105 and the mobile device 110 may identify and receive the output tone within a predetermined distance or range "d" from the tone transmission device 105. A tone transmission device 105 may have a wide variety of different ranges as desired in various embodiments of the invention, for example, a range of approximately three feet. In certain embodiments of the invention, the tone processing application 137 of the mobile device 110 may control the receipt of tones by the mobile device 110. For example, a setting or option associated with the tone processing application 137 may control the receipt of tones by the mobile device 110. When a user indicates that the setting or option should be set to allow tones to be received, the receipt of tones may be facilitated by the mobile device 110. However, when a user indicates that the setting or option should be set to disallow the receipt of tones, then the mobile device 110 will not process any tones output by a tone transmission device 105. In some embodiments, tones may be received and processed when a user of the mobile device opens, executes, or "leaves on" the tone processing application 137. In other embodiments, tones may be received and processed only when a user selects an option within the tone processing application 137 indicating that tones should be received.

The mobile device 110 may include one or more input devices that facilitate the receipt of tones. For example, a microphone 141 associated with the mobile device 110 may be utilized to receive tones that have been output by one or more speakers associated with a tone transmission device 105. After being received by the microphone 141, a tone may be passed through one or more filters 142, for example, one or more band pass filters that facilitate the isolation of the tone from other transmissions received by the microphone 141. The filtered tone may then be passed through one or more analog-to-digital converters 143 prior to being communicated to the one or more mobile device processors 131. In this regard, an analog tone may be transformed into digital information that may be processed by the tone processing application 137. The tone processing application 137 may process the digital information associated with the tone, and the tone processing application 137 may extract user prompting information such as one or more location identifiers and/or other data associated with the tone. In certain embodiments of the invention, the tone processing application 137 may further filter the received digital information with one or more digital filters or software filters.

In an example embodiment of the invention, once one or more location identifiers have been extracted by the tone processing application 137, the tone processing application 137 may utilize the one or more location identifiers to receive user prompting information associated with the tone, for example, user interfaces that include one or more prompts relating to voting information, rating information, content selection information, user preference information, and/or the like. The one or more location identifiers may facilitate the identification of one or more information sources 115 from which user prompting information associated with the tone may be received. The tone processing application 137 may direct the communication of a request for the user prompting information to at least one information source 115 via a suitable network 140. The request may include at least one location identifier, an identifier of the user of the mobile device 110 (e.g., a user identification number, account number, or the like), and/or an identifier of the mobile device 110, for example, a telephone number associated with the mobile device 110, a universal integrated circuit card (UICC) identifier, a unique device identifier (UDID), a subscriber identity module (SIM) card identifier, an international mobile subscriber identity (IMSI) number associated with the mobile device 110, or any other identifier that facilitates communication with an information source (e.g., a First Data Mobile Gateway identifier). Responsive to the request, the mobile device 110 may receive the requested user prompting information associated with the tone via the network 140. The tone processing application 137 may process at least a portion of the received user prompting information. Additionally, the tone processing application 137 may direct the storage of the one or more location identifiers and/or the received user prompting information in the memory 132 of the mobile device 110. As desired, at least a portion of the received user prompting information may be presented or output to a user of the mobile device 110 via one or more suitable output devices associated with the mobile device 110, for example, a display, speaker, headset, or an output device external to the mobile device 110.

The user prompting information associated with a tone may be utilized by a mobile device 110 for a wide variety of different purposes as desired in various embodiments of the invention. For example, user prompting information may include one or more prompts for voting information, rating information, content selection information, user preference information, and/or the like, and/or the like to be output to the mobile device user. At least a portion of the user prompting information may be formatted for and displayed to a user of the mobile device 110 via a suitable output device associated with the mobile device 110 (e.g., an LCD display). As another example, user prompting information may facilitate a mobile device user providing feedback information in response to the displayed user prompting information. Hence, user input associated with the user prompting information may be received and processed at the mobile device. Such feedback information may be transmitted to one or more information sources for additional processing, as discussed in further detail with reference to FIGS. 5-6 below. In other embodiments, the feedback information may be stored by the mobile device 110 and utilized in a subsequent transaction.

Embodiments of the invention may include mobile devices 110 with more or less than the components illustrated for the mobile device 110 illustrated in FIG. 1. The description of the mobile device 110 of FIG. 1 is provided by way of example only and is not intended to be limiting.

With continued reference to FIG. 1, the system 100 may include any number of information sources 115 that are operable to provide user prompting information associated with tones to a mobile device and/or receive feedback information from mobile devices and/or mobile device users. The user prompting information may be communicated to a mobile device 110 by an information source 115 in response to a request for the user prompting information. In certain embodiments of the invention, a mobile device 110 may communicate requests for user prompting information and/or response messages containing feedback information directly to any number of information sources 115. In other embodiments, the mobile device 110 may communicate requests to a single information source or a central information source. The central information source may communicate with other information sources as desired in various embodiments of the invention and collect user prompting information that is communicated to the mobile device 110 and/or deliver feedback information received from the mobile device 110 to other information sources. Additionally or alternatively, the central information source may establish direct communication between the mobile device 110 and another information source, for example, via handing off a network session between the mobile device 110 and the central information source to another information source.

An information source 115 may be a processor driven device or network entity that facilitates the receipt of a request for user prompting information or data associated with a tone, the accessing of the user prompting information, and the communication of the user prompting information to another component of the system 100 in response to the received request for the user prompting information. For example, the user prompting information may be communicated to the mobile device 110 or to another information source 115 in response to a request for the user prompting information. The information source 115 may include any number of processors and/or processing components as desired in various embodiments of the invention. For example, the information source 115 may include any number of special purpose computers or other particular machines, application specific circuits, microcontrollers, personal computers, servers, and/or the like. In certain embodiments, at least a portion of the operations of the information source 115 may be controlled by computer-executed or computer-implemented instructions that are executed by one or more processors associated with the information source 115. The instructions may be embodied in one or more software components as desired in various embodiments of the invention. The execution of the instructions may form a special purpose computer or other particular machine that is operable to receive and process requests for user prompting information associated with tones and/or receive and process feedback information received in response to the user prompting information. Additionally, in certain embodiments of the invention, the operations and/or control of the information source 115 may be distributed amongst several processing components.

The information source 115 may include one or more processors 151, one or more memory devices 152, one or more input/output (I/O) interface(s) 153, and one or more network interface(s) 154. The one or more memory devices 152 may be any suitable memory devices, for example, caches, read only memory devices, random access memory devices, magnetic storage devices, databases, etc. The one or more memory devices 152 may store data, executable instructions, and/or various program modules utilized by the information source 115, for example, stored user prompting data 155 associated with tones, an operating system 156, user profiles 158, and/or a user prompting module (e.g., a feedback information processing module) 157. The stored user prompting data 155 may include any user prompting information associated with a tone that may be received by a mobile device 110.

In certain embodiments of the invention, the information source 115 may include one or more software modules, such as an operating system 156 and/or a user prompting module 157. The operating system 156 may control the general operation of the information source 115 and may facilitate the execution of other software modules by the one or more processors 151, for example, the execution of the user prompting module 157. The user prompting module 157 may include computer-executable instructions that facilitate the receipt and processing of one or more requests for user prompting information associated with tones. For example, the user prompting module 157 may facilitate and/or control the receipt, from one or more mobile devices 110 and/or other information sources, of requests for user prompting information associated with tones, the processing of the received requests to access the user prompting information, and the communication of the user prompting information to the requesting entity. Additionally, the user prompting module 157 may facilitate and/or control network communication between the information source 115 and one or more external devices, such as, a mobile device 110 and/or other information sources. Although the user prompting module 157 is illustrated as a single software component, the user prompting module 157 may include any number of software components, modules, and/or applications as desired in various embodiments of the invention.

A request for user prompting information associated with a tone may include one or more location identifiers and/or other unique identifiers that have been extracted from the tone by the mobile device 110. Additionally, the request may include an identifier of the mobile device 110 and/or an identifier of the user of the mobile device. The user prompting module 157 may receive the request and process the request to extract the one or more location identifiers, the identifier of the mobile device 110, and/or the identifier of the user of the mobile device. In other words, the received request may be transformed by the user prompting module 157 into data that is representative of the one or more location identifiers, the identifier of the mobile device 110, and/or the identifier of the user of the mobile device. The one or more location identifiers, the identifier of the mobile device 110, and/or the identifier of the user of the mobile device may be utilized to access user prompting information associated with a tone.

For example, a location identifier may be utilized to search for user prompting information associated with a tone that is stored in a memory 152 of the information source. In certain embodiments, a location identifier may function as a pointer to stored user prompting information. As another example, a location identifier may be utilized in the generation of a request for user prompting information that is communicated to another information source, such as a third party information source. One or more location identifiers may reference other information sources and/or memory locations associated with the other information sources. The user prompting module 157 may generate a request for user prompting information and communicate the request to the other information sources. The request may be processed by a host module of the other information sources and the requested user prompting information may be communicated to the requesting user prompting module 157. Once the user prompting information has been obtained by the user prompting module 157, at least a portion of the user prompting information may be communicated by the user prompting module 157 to the mobile device 110 via one or more suitable networks 140.

The information source(s) 115 may include (or have access to) user profiles 158. In example embodiments of the invention, the user profiles 158 may store identifying information associated with one or more mobile devices, such as mobile device numbers, UICC identifiers, UDID identifiers, SIM card identifiers, or IMSI numbers, or identifying information associated with mobile device users, such as name, email address, username, identification number, an account number, home address, area code, zip code, phone number, and/or other information associated with the mobile device and/or mobile device user that would be useful in providing user prompting information and/or additional content to the mobile device user (e.g., previous feedback information provided by a particular mobile device user, etc.). In certain embodiments, a user profile 158 may include one or more user preferences associated with types of desired tones and/or user prompting information that may be requested from and/or processed by the information source 115. For example, the user profile 158 may include preferences indicating that certain tones and/or user prompting information should be or should not be transmitted to a particular mobile device user and/or processed by the information source 115. In this regard, tones and/or user prompting information may be filtered by the information source 115. A wide variety of different preferences and/or criteria may be utilized as desired in various embodiments, including but not limited to, merchant criteria, merchant class or merchant type criteria, broadcaster criteria, marketing source criteria, etc. As another example, the user profile 158 may include one or more preferences associated with the manner in which tones and/or user prompting information should be transmitted to a particular mobile device user and/or processed by the information source(s) 115.

In other embodiments of the invention, a user profile 158 may include user prompting information and/or feedback information specific to a particular "user" (e.g., the mobile device or mobile device user). In an example embodiment of the invention, other information may also be stored in the user profile 158, such as transaction history information, previous feedback information supplied, and/or other information. Such user-specific information may be utilized to provide additional content (e.g., media content, advertisements, etc.) to the mobile device user and/or additional user prompting information. In some embodiments of the invention a user's user profile 158 may be accessible via a website or other user interface, thereby allowing the consumer to monitor their previous transactions and/or previously submitted feedback information via the Internet and/or various user interface access point (e.g., kiosks, etc.).

The one or more I/O interfaces 153 may facilitate communication between the information source 115 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the information source 115 may be received and information processed by the information source 115 may be output.

The one or more network interfaces 154 may facilitate connection of the information source 115 to one or more suitable networks 140, for example, a cellular network, a local area network, a wide area network, the Internet, a Bluetooth enabled network, a Wi-Fi network, a radio frequency network, any wired network, any wireless network, etc. In this regard, the information source 115 may receive requests for user prompting information and may communicate the user prompting information to a requesting mobile device 110. Additionally, the information source 115 may communicate with other information sources as desired. The information source 115 may utilize a wide variety of different techniques, methods, and/or systems to communicate with a mobile device 110 and/or with other information sources. For example, a web server or other specific purpose or dedicated application may facilitate communication between the information source 115 and the mobile device 110. As another example, short message service (SMS) communications may be utilized to facilitate communication between the information source 115 and the mobile device 110.

Embodiments of the invention may include information sources 115 with more or less than the components illustrated for the information source 115 illustrated in FIG. 1. The description of the information source 115 of FIG. 1 is provided by way of example only and is not intended to be limiting.

In certain embodiments of the invention, at least a portion of the user prompting information associated with a tone may be stored by a mobile device 110 prior to the receipt of the tone by the mobile device 110 (e.g., as part of a software application existing on the mobile device). The tone processing application 137 of the mobile device may process the received tone to extract one or more location identifiers, and the one or more extracted location identifiers may be utilized to access at least a portion of the prestored information. The user prompting information may be received by and prestored on the mobile device 110 utilizing a wide variety of different techniques or methods as desired. For example, the user prompting information may be received from an information source via one or more suitable networks, for example, a Bluetooth enabled network, a Wi-Fi network, an RFID network, cellular network, Internet connection, etc. The receipt, storage, subsequent access, and/or subsequent processing of the user prompting information may be managed by the tone processing application 137 in certain embodiments of invention. In this example, a user may be provided with user prompting information that is stored on the mobile device 110, such as when encountering one or more tone transmission devices 105, for example, when listening to the radio, when shopping at a retail outlet, or when watching television content.

With continued reference to FIG. 1, the system 100 may include any number of data sources 120 that are operable to communicate or otherwise provide tone data to the tone transmission device 105. In certain embodiments of the invention, a data source 120 may communicate tone data to the tone transmission device 105 via one or more suitable networks 130. Tone data may be communicated to a tone transmission device 105 in response to the receipt, from the tone transmission device 105, of a request for the tone data. Alternatively, a data source 120 may push or otherwise communicate tone data to the tone transmission device 105 without the tone data being requested. For example, in a merchant location, a data source 120 may push tone data associated with a product to a tone transmission device 105 situated proximate to the product. As another example, a data source 120 may include a broadcasting entity that incorporates tone data into broadcast information, such as a radio or television broadcast, that is communicated to a radio or television that functions as a tone transmission device, such as is described with reference to FIG. 3. According to one example embodiment, the data source 120 can be a component of an information source 115, or otherwise associated with a same entity as an information source 115, such as a back-end processor facilitating communications associated with information carrying tones and/or user prompting and/or feedback information communications.

A data source 120 may be a processor driven device or network entity that facilitates the communication tone data to another component of the system 100, for example, a tone transmission device 105 or another data source 120. The data source 120 may include any number of processors and/or processing components as desired in various embodiments of the invention. For example, the data source 120 may include any number of special purpose computers or other particular machines, application specific circuits, microcontrollers, personal computers, servers, and/or the like. In certain embodiments, at least a portion of the operations of the data source 120 may be controlled by computer-executed or computer-implemented instructions that are executed by one or more processors associated with the data source 120. The instructions may be embodied in one or more software components as desired in various embodiments of the invention. The execution of the instructions may form a special purpose computer or other particular machine that is operable to communicate tone data. Additionally, in certain embodiments of the invention, the operations and/or control of the data source 120 may be distributed amongst several processing components.

The data source 120 may include one or more processors 161, one or more memory devices 162, one or more input/output (I/O) interface(s) 163, and one or more network interface(s) 164. The one or more memory devices 162 may be any suitable memory devices, for example, caches, read only memory devices, random access memory devices, magnetic storage devices, databases, etc. The one or more memory devices 162 may store data, executable instructions, and/or various program modules utilized by the data source 120, for example, tone data 165 associated with tones, an operating system 166, and/or a host module 167. The stored tone data 165 may include stored data associated with a tone that is communicated to a tone transmission device 105 for output by the tone transmission device 105. For example, the stored tone data 165 may include stored digital data associated with a tone, such as, a WAV file, MP3 file, MPEG file, AIFF file, AAC file, Apple Lossless file, or other digital media file format.

In certain embodiments of the invention, the data source 120 may include one or more software modules, such as an operating system 166 and/or a host module 167. The operating system 166 may control the general operation of the data source 120 and may facilitate the execution of other software modules by the one or more processors 161, for example, the execution of the host module 167. The host module 167 may include computer-executable instructions that facilitate the communication of tone data 165 to a tone transmission device 105. For example, the host module 167 may facilitate and/or control the receipt, from a tone transmission device 105, of a request for tone data 165, the processing of the received requests to access the tone data 165, and/or the communication of tone data 165 to the tone transmission device 105. As another example, the host module 167 may facilitate the establishment of a network session or other communication with the tone transmission device 105, and the host module 167 may direct the communication or transmission of tone data 165 to the tone transmission device 105. The host module 167 may also facilitate and/or control network communication between the data source 120 and one or more other data sources. Although the host module 167 is illustrated as a single software component, the host module 167 may include any number of software components, modules, and/or applications as desired in various embodiments of the invention.

The one or more I/O interfaces 163 may facilitate communication between the data source 120 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the data source 120 may be received and information processed by the data source 120 may be output.

The one or more network interfaces 164 may facilitate connection of the data source 120 to one or more suitable networks 130, for example, a local area network, a wide area network, the Internet, a cellular network, a television broadcast network, a television cable network, a television satellite network, a radio broadcast network, a Bluetooth enabled network, a Wi-Fi network, a radio frequency network, any wired network, any wireless network, etc. In this regard, the data source 120 may communicate tone data 125 to a tone transmission device 105. Additionally, the data source 120 may communicate with other data sources as desired in various embodiments of the invention. For example, a first data source 120 may receive tone data 125 from a second data source 120, and the first data source 120 may communicate the received tone data 125 to the tone transmission device 105.

Embodiments of the invention may include data sources 120 with more or less than the components illustrated for the data source 120 illustrated in FIG. 1. The description of the data source 120 of FIG. 1 is provided by way of example only and is not intended to be limiting. Additionally, in certain embodiments, a data source 120 and an information source 115 may be the same device or system.

Although FIG. 1 has been described as having specific functions performed by specific components of the system 100, various functions and/or operations of embodiments of the invention may be performed by any suitable component of the system 100. In certain embodiments, various functions and/or operations that are described as being performed by multiple components may be performed by a single component of the system 100. For example, a tone transmission device 105 may also function as an information source 115. Additionally, various operations may be completed in a distributed manner by multiple components of the system 100.

Additionally, certain components of the system 100 are described as having any number of processors or processing components. Operations may be completed by the one or more processors as desired in various embodiments of the invention. A different processor may be provided to complete or facilitate each operation of a system component, or alternatively, multiple operations may be completed or facilitated by a single processor. For example, a first processor of the mobile device 110 may facilitate the processing of a received tone to extract one or more location identifiers associated with the tone; a second processor may facilitate the storage of the extracted one or more location identifiers; a third processor may facilitate the communication of a request for user prompting information associated with the tone to one or more information sources; and a fourth processor may facilitate the receipt of the requested user prompting information from the one or more information sources and/or the processing of feedback information received from a mobile device user in response to receiving the user prompting information at the mobile device. As desired, two or more of the first, second, third, and fourth processors may be the same processor. The operations of other components of the system 100 may, in some embodiments of the invention, be completed and/or facilitated in a similar distributed manner.

FIG. 2 is a diagram of one example data flow 200 of transmitting an information carrying tone and retrieving user prompting information associated with the tone, according to an illustrative embodiment of the invention. The data flow 200 may be applicable to a wide variety of systems utilized to communicate tones to a mobile device, including but not limited to, the system 100 illustrated in FIG. 1.

With reference to FIG. 2, a tone data source 205 may communicate an information carrying tone 210 to a tone transmission device 215. The tone transmission device 215 may include any device that is capable of communicating or outputting the tone 210 to the mobile device 220, such as any tone transmission device 105 described with reference to FIG. 1, for example. The tone data source 205 may include any device or number of devices that are capable of communicating a tone 210 or user prompting information associated with a tone (e.g., one or more location identifiers) to the tone transmission device 215, such as any tone data source 120 described with reference to FIG. 1, for example. In various embodiments of the invention, the tone data source 205 may communicate a tone 210 or user prompting information associated with a tone (e.g., one or more location identifiers) to the tone transmission device 215 in response to a request that is received from the tone transmission device 215. In other embodiments of the invention, the tone data source 205 may proactively push the tone 210 or user prompting information associated with a tone to the tone transmission device 215 via a suitable network. In still other embodiments of the invention, the tone data source 205 may output one or more tones via one or more suitable output devices, such as one or more speakers, and the one or more tones, may be received and processed by the tone transmission device 215. The one or more tones output by the tone data source 205 may include the tone 210 and/or user prompting information associated with a tone (e.g., one or more location identifiers).

Although FIG. 2 illustrates the tone data source 205 as communicating a tone 210 to the tone transmission device 215, in various embodiments of the invention, the tone data source 205 may communicate user prompting information associated with the tone 210 to the tone transmission device 215, and the tone transmission device 215 may utilize a portion or all of the received user prompting information to generate the tone 210 that is to be output by the tone transmission device 215.

Additionally, in various embodiments of the invention, the tone 210 and/or user prompting information associated with the tone 210 may be stored by the tone transmission device 215 in one or more suitable memory devices 216, for example, one or more caches, read only memory devices, random access memory devices, magnetic storage devices, etc. In certain embodiments, the tone 210 or user prompting information associated with the tone 210 may be accessed from the one or more memory devices 216 and output by the tone transmission device 215. Additionally, in certain embodiments, user prompting information associated with the tone 210 may be utilized by the tone transmission device 215 to generate the tone 210 to be output.

In certain embodiments of the invention, the tone 210 may be communicated from the tone transmission device 215 to the mobile device 220 by being output from one or more suitable output devices associated with the tone transmission device 215, for example, one or more speakers. In certain embodiments, the tone 210 may be output by the tone transmission device 215 in response to a request that is received from the mobile device 220. In other embodiments, the tone 210 may be proactively output by the tone transmission device 215 for reception by the mobile device 220. For example, the tone 210 may be periodically output by the tone transmission device 215 at regular time intervals, such as, every 5 seconds, every 10 seconds, every 15 seconds, etc. As another example, the tone 210 may be continuously output by the tone transmission device 215 in a loop. In other embodiments of the invention, the tone 210 may be output by the tone transmission device 215 based upon the receipt of user input to output the tone 210.

After being output by the tone transmission device 215, the tone 210 may be received by the mobile device 220. According to an aspect of the invention, the tone 210 may be received by a microphone associated with the mobile device 220. After being received by a microphone, the tone 210 may be processed through one or more filters (e.g., band pass filters) as desired and converted into digital data utilizing an analog-to-digital converter. The digital data from the tone 210 may be processed by one or more appropriate software modules and/or software applications associated with the mobile device 220, for example, the tone processing application 137 as described above with reference to FIG. 1. One or more location identifiers (and/or other user prompting information) may be extracted from the digital data by the mobile device 220. Additionally, as desired in various embodiments of the invention, the received tone 210, digital data, and/or the one or more extracted location identifiers (and/or other user prompting information) may be stored in one or more suitable memory devices 221 associated with the mobile device 220, for example, one or more caches, read only memory devices, random access memory devices, etc.

In an example embodiment of the invention, the mobile device 220 may utilize the one or more extracted location identifiers to request user prompting information associated with the tone 210 from one or more information sources 230. The mobile device 220 may generate a request 225 for user prompting information associated with the tone 210, and the mobile device 220 may communicate the request 225 to one or more information sources 230. The request 225 may include one or more of the extracted location identifiers, an identifier of the user of the mobile device 220, and/or an identifier of the mobile device 220, for example, a universal integrated circuit card (UICC) identifier, a unique device identifier (UDID), a subscriber identity module (SIM) card identifier, an international mobile subscriber identity (IMSI) number associated with the mobile device 220, or any other identifier that facilitates communication with an information source (e.g., a First Data Mobile Gateway identifier). In certain embodiments, the mobile device 220 may communicate with a central information source 230 when requesting user prompting information associated with a tone 210. In certain other embodiments, one or more of the location identifiers may identify one or more information sources that the mobile device 220 will communicate with in order to request user prompting information associated with a tone 210. In other embodiments, the mobile device 220 may initially communicate with a central information source 230 and a communication session may be passed off by the central information source 230 to another information source. In yet other embodiments, the mobile device 220 may initially communicate with a central information source 230 and the central information source 230 may establish communication sessions between the mobile device 220 and one or more other information sources. FIG. 2 illustrates the mobile device 220 communicating with a single information source 230 to request user prompting information associated with a tone 210; however, the mobile device 220 may communicate with any number of information sources 230, 240 as desired in other embodiments of the invention to request user prompting information and/or to provide feedback information in response to user prompting information received at the mobile device.

The request 225 for user prompting information associated with a tone 210 may be communicated from a mobile device 220 to an information source 230 via one or more suitable networks, for example, a cellular network, a local area network, a wide area network, the Internet, a Bluetooth enabled network, a Wi-Fi network, a radio frequency network, any wired network, any wireless network, etc. The request 225 may be received and processed by the information source 230. The information source 230 may utilize one or more of the location identifiers to access user prompting information 235 associated with the tone 210 from any number of suitable memory devices 231 associated with the information source, for example, caches, read only memory devices, random access memory devices, magnetic storage devices, databases, etc.

Additionally, in certain embodiments of the invention, the information source 230 may communicate a request 245 for user prompting information associated with the tone 210 to one or more third party information sources 240, such as is further described with reference to FIG. 7, for example. The one or more third party information sources 240 may be identified by the information source 230 from one or more of the location identifiers extracted from the tone 210 by the mobile device 220. The request 245 that is communicated to the one or more third party information sources 240 may include one or more location identifiers extracted from the tone 210 and/or an identifier of the information source 240. Communication between the information source 230 and the one or more third party information sources 240 may be facilitated via one or more suitable networks, for example, a local area network, a wide area network, the Internet, a Bluetooth enabled network, a Wi-Fi network, a radio frequency network, any wired network, any wireless network, etc.

A third party information source 240 may receive and process a request 245 for user prompting information from the information source 230. The third party information source 240 may utilize one or more of the location identifiers to access user prompting information 250 associated with the tone 210 from any number of suitable memory devices 241 associated with the third party information source 240, for example, caches, read only memory devices, random access memory devices, magnetic storage devices, databases, etc. The third party information source 240 may then communicate the accessed user prompting information 250 to the information source 230 via the one or more suitable networks in response to the request 245. The information source 230 may receive the user prompting information 250 from the third party information source 240. In some embodiments, user prompting information 250 may be received by the information source 230 from multiple third party information sources 240, and the information source 230 may combine the received user prompting information 250 to generate the user prompting information 235 that will be communicated to the mobile device 220. Additionally, as desired in various embodiments, user prompting information 250 received from third party information sources 240 may be combined with other user prompting information accessed by the information source 230. When combining information received and/or accessed from various sources, the information source 230 may extract duplicate information and/or resolve conflicts between conflicting information as desired in various embodiments. In this regard, the user prompting information 235 to be communicated to the mobile device 220 may be formatted for communication to the mobile device 220.

Once the user prompting information 235 associated with the tone 210 has been accessed and/or received by the information source 230, the information source 230 may communicate the user prompting information 235 to the mobile device 220 in response to the request 225 for user prompting information that was received from the mobile device 220. In certain embodiments, the information source 230 may store various data associated with a request for user prompting information 235 that is received from the mobile device 220. For example, the information source 230 may store an indication that the mobile device 220 requested the user prompting information 235 and/or an indication that the user prompting information 235 was communicated to the mobile device 220. In this regard, tone activity for a user of the mobile device 220 may be tracked by the information source 230.

The mobile device 220 may receive the user prompting information 235 from the information source 230. As desired in various embodiments, the mobile device 220 may output at least a portion of the user prompting information to a user of the mobile device 220 via one or more suitable output devices, for example, a display of the mobile device 220. Additionally, as desired in various embodiments, the mobile device 220 may store a portion or all of the received user prompting information 235 in memory 221. As an example, user prompting information, such as prompts for voting information, rating information, content selection information, user preference information, and/or the like, associated with the tone 210 may be displayed to the user. In certain embodiments, the mobile device 220 may utilize at least a portion of the user prompting information 235 to communicate with another entity. For example, the user prompting information 235 may include a link, such as a hyperlink, that facilitates the establishment of communication between the mobile device 220 and another entity, such as, information source 230, 240, or another entity, system, or device associated with the tone 210. In this regard, the mobile device 220 may be utilized to access other information associated with the tone 210, for example, a website that includes user prompting information. Additionally, in various embodiments of the invention, in response to outputting user prompt information at the mobile device, the mobile device 220 user may provide various types of feedback information via the I/O interfaces of the mobile device 220, which may then be transmitted to one or more information sources 230 and/or third party information sources 240 for additional processing. The creation, receipt, and processing of feedback information provided by the mobile device user is discussed in further detail below with reference to FIGS. 5-6.

Many variations may be made to the data flow 200 illustrated in FIG. 2 as desired in various embodiments of the invention. The data flow 200 is not intended to be limiting, but instead is provided by way of example only as an illustrative embodiment of the invention.

FIG. 3 is a schematic diagram of yet another example system 300 that may facilitate the communication of information to a mobile device 315 via a tone transmission device 310 operable to communicate a broadcast signal, such as a television or radio signal, according to an illustrative embodiment of the invention. Accordingly, the system of FIG. 3 may facilitate the communication of one or more information carrying tones to a tone transmission device 310 via a broadcast signal, for example, a radio or television broadcast.

With reference to FIG. 3, the system 300 may include a broadcast entity 305, a tone transmission device 310, and a mobile device 315. The broadcast entity 305 may be operable to generate a broadcast signal or a broadcast stream that is communicated directly and/or indirectly to any number of tone transmission devices 310. Examples of broadcast companies include, but are not limited to, television networks, television broadcast companies, radio stations, etc. Examples of broadcast signals include, but are not limited to, television broadcast signals, radio broadcast signals, Internet content, etc.

The tone transmission device 310 according to this embodiment may be any suitable device that is operable to receive a broadcast signal and output at least a portion of the received broadcast signal to one or more users. Examples of tone transmission devices 310 include, but are not limited to, televisions, radios, television antennas, cable boxes, satellite television receivers, satellite radios, any combination of these devices (e.g., a television and a cable box), etc.

As desired in various embodiments of the invention, one or more tones may be included in a broadcast signal that is received by a tone transmission device 310. The tone transmission device 310 may receive the one or more tones in a broadcast signal and output the one or more received tones with the broadcast signal. The one or more received tones may be communicated by the tone transmission device 310 to a mobile device 315. For example, one or more suitable output devices 320, such as one or more speakers associated with the tone transmission device 310, may be utilized to output the one or more tones. The one or more tones may then be received by one or more input devices 325, such as a microphone, associated with the mobile device 315. In this regard, one or more tones included in a broadcast signal may be communicated to a mobile device 315, and the mobile device 315 may process the one or more received tones to extract user prompting information and/or one or more location identifiers that may be utilized to obtain user prompting information for output to a mobile device user to gather user feedback information associated with the one or more tones, as is described in further detail with reference to FIGS. 5-7 below.

In certain embodiments of the invention, a broadcast entity 305 may communicate a broadcast signal directly to a tone transmission device 310. For example, a broadcast entity 305 may utilize one or more transmission towers 330 to transmit or otherwise communicate audio and/or video signals that may be directly received by the tone transmission device 310 and/or equipment associated with the tone transmission device 310, for example, an antenna associated with the tone transmission device 310.

In other embodiments of the invention, a broadcast entity 305 may communicate a broadcast signal to one or more intermediary systems and/or service providers 335, 340, 345, 350. The one or more intermediary systems and/or service providers 335, 340, 345, 350 may receive the broadcast signal from the broadcast entity 305 and communicate the broadcast signal to the tone transmission device 310. A wide variety of techniques and/or systems may be utilized as desired to communicate the broadcast signal from the broadcast entity 305 to an intermediary system or service provider 335, 340, 345, 350. For example, the broadcast entity 305 may communicate a broadcast signal to an intermediary system 335, 340, 345, 350 via one or more satellites 355 and/or satellite communications systems, such as, the EchoStar Technologies™ satellite communications system. As another example, the broadcast entity 305 may communicate a broadcast signal to an intermediary system 335, 340, 345, 350 via one or more suitable networks 360, such as, a fiber optic network, a cable network, an IP television network, the Internet, a wide area network, any suitable wired network, and/or any suitable wireless network. As yet another example, the broadcast entity 305 may utilize one or more transmission towers 330 to transmit or otherwise communicate the broadcast signal to an intermediary system 335, 340, 345, 350.

Any number of intermediary systems and/or service providers 335, 340, 345, 350 may be utilized as desired in various embodiments of the invention. An intermediary system 335, 340, 345, 350 may receive a broadcast signal from a broadcast entity 305 or from another intermediary system 335, 340, 345, 350 as desired in various embodiments. The intermediary system 335, 340, 345, 350 may then communicate the received broadcast signal to the tone transmission device 310 or to another intermediary system 335, 340, 345, 350. For purposes describing example intermediary systems 335, 340, 345, 350, the intermediary systems 335, 340, 345, 350 will be described as receiving a broadcast signal from a broadcast entity 305 and communicating the received broadcast signal to a tone transmission device 310. Examples of intermediary systems and/or service providers include, but are not limited to, a satellite provider 335, a cable provider 340, a local provider 345, and an internet service provider 350.

A satellite provider 335 may receive a broadcast signal from the broadcast entity 305 and transmit or otherwise communicate at least a portion of the broadcast signal to the tone transmission device 310 via one or more suitable satellites 365 and/or satellite communications systems, for example, a satellite television communications system or a satellite radio communications system. Similarly, a cable provider 340 may receive a broadcast signal from the broadcast entity 305 and transmit or otherwise communicate at least a portion of the broadcast signal to the tone transmission device 310 via one or more suitable cable networks 370. Similarly, a local provider 345 may receive a broadcast signal from the broadcast entity 305 and transmit or otherwise communicate at least a portion of the broadcast signal to the tone transmission device 310 via one or more suitable transmission towers 375. Similarly, an internet service provider (ISP) 350 may receive a broadcast signal from the broadcast entity 305 and transmit or otherwise communicate at least a portion of the broadcast signal to the tone transmission device 310 via one or more suitable Internet connections, for example, a wide area network, etc.

As desired in various embodiments of the invention, one or more information carrying tones may be incorporated into or included in the broadcast signal that is received by the tone transmission device 310. The one or more tones may be incorporated into the broadcast signal by the broadcast entity 305 and/or by one or more intermediary systems 335, 340, 345, 350. For example, the broadcast entity 305 may insert, layer, embed, or otherwise incorporate one or more tones into a broadcast stream prior to or during the communication of the broadcast stream to a tone transmission device 310 or to an intermediary system 335, 340, 345, 350. The one or more tones may relate to, for example, products or services that are advertised via the broadcast stream (e.g., television or radio advertisement), programs included in the broadcast stream (e.g., television shows, movies, radio shows), etc. The incorporation of a tone into the broadcast stream may include the insertion of the tone into the broadcast stream utilizing a wide variety of different techniques and/or methods, for example, modulation, the insertion of a digital packet of information that includes the tone, the transmission of the tone in a separate channel or carrier signal, etc. Additionally, as desired in various embodiments of the invention, a tone may be incorporated into the broadcast stream as either an analog signal or as digital information.

With continued reference to FIG. 3, the system 300 may include one or more tone data sources 385. Each tone data source 385 may be operable to communicate or otherwise provide one or more tones and/or data associated with the generation of one or more tones to the broadcast entity 305 and/or an intermediary system 335, 340, 345, 350. In certain embodiments of the invention, a tone data source 385 may communicate tones and/or tone data to the broadcast entity 305 and/or an intermediary system 335, 340, 345, 350 via one or more suitable networks 360, for example, a local area network, a wide area network, the Internet, a telephone network, a broadcast network, a cellular network, a Bluetooth enabled network, a Wi-Fi network, a radio frequency network, any wired network, any wireless network, etc. In this regard, the broadcast entity 305 and/or an intermediary system 335, 340, 345, 350 may receive tones that are inserted into a broadcast signal and/or information that may be utilized to generate tones that are inserted into a broadcast signal. Tones and/or tone data may be communicated to the broadcast entity 305 and/or an intermediary system 335, 340, 345, 350 in response to the receipt of a request for the tones and/or tone data. Alternatively, a tone data source 385 may push or otherwise communicate tones and/or tone data to the broadcast entity 305 and/or an intermediary system 335, 340, 345, 350 without the tones and/or tone data being requested. Each tone data source 385 may be a suitable processor driven device with components that are similar to the tone data sources 120 described above with reference to FIG. 1 and the tone data sources 205 described above with reference to FIG. 2. According to one example embodiment, the tone data source 385 may be a component of an information source, such as is described with reference to FIGS. 1-2, or otherwise associated with the same entity as an information source, such as a back-end processor facilitating communications associated with information carrying tones.

Once the broadcast stream is received by the tone transmission device 310, the tone transmission device 310 may process and output at least a portion of the received broadcast stream via one or more suitable output devices 320, for example, one or more displays and/or speakers associated with the tone transmission device 310. A wide variety of tone transmission devices 310 may be utilized as desired in various embodiments of the invention, for example, a radio, television, projector, computer, etc. In certain embodiments of the invention, the broadcast stream may be processed and output in real time or near real time as it is received by the tone transmission device 310. In other embodiments of the invention, at least a portion of the broadcast stream may be stored in one or more suitable memory devices associated with the tone transmission device 310 (e.g., a digital video recorder), and the stored portion of the broadcast stream may be accessed from memory, processed, and/or output at a subsequent point in time.

During the outputting of the broadcast stream by the tone transmission device 310, one or more tones included in the broadcast stream may be output. A mobile device 315 that is within a predetermined distance or range "d" from the tone transmission device 310 may be utilized to receive the one or more tones that are output. The mobile device 315 may process one or more received tones in order to extract user prompting information and/or one or more location identifiers that are utilized to request and receive other user prompting information associated with the one or more tones from an information source and/or the like. In this regard, feedback information associated with a broadcast stream, for example, user-specific voting information, rating information, content selection information, and/or user preference information provided by the mobile device user may be received from a mobile device 315 via the user prompting information presented to a user of the mobile device.

FIG. 4 illustrates a block diagram of data that may be included in an example information carrying tone, according to an illustrative embodiment of the invention. With reference to FIG. 4, an information carrying tone 400 may include a header portion 405, a data portion 410, and/or a check sum portion 415, according to one embodiment. The header portion 405 may include, for example, information that identifies the tone 400 and data portion 410 that is included in the tone 400. The data portion 410 may include a data payload, for example, one or more location identifiers (and/or other user prompting information), that may be extracted from the tone 400 by a mobile device. Any number of location identifiers may be included in the data portion 410 as desired in various embodiments of the invention. In the example embodiment shown in FIG. 4, location identifiers 420 and/or information source identifiers 425 may be included in the data portion 410 as desired. An information source identifier 425 may identify, reference, or point to an information source at which user prompts and/or user feedback information associated with the tone 400 is stored. A location identifier 420 may identify, reference, or point to a memory location or block of memory at which user prompting information associated with the tone 400 is stored at an information source and/or user feedback will be stored and/or further processed. Other user prompt information may be included in the data portion 410 of the tone 400, according to various embodiments. In other embodiments of the invention, user-specific identifiers and/or other information may also be included in the data portion 410 of the tone. As shown in the example embodiment of FIG. 4, the check sum portion 415 may include information that may be utilized by a receiving mobile device to verify that the tone 400 has been properly received.

The tone 400 described with reference to FIG. 4 illustrates one example of the information that may be included in a tone 400 that is utilized in various embodiments of the invention described herein. A wide variety of other information and/or information formats may be utilized to form a tone as desired in various embodiments of the invention. The tone 400 of FIG. 4 is provided by way of example only and is not intended to be limiting.

Additionally, when a tone is output to a mobile device by a tone transmission device, the tone may be output as an analog signal. In certain embodiments of the invention, analog data for a tone may be received or accessed from memory by a tone transmission device, and the analog data may be output for receipt by a mobile device. In other embodiments of the invention, digital data for a tone may be received or accessed from memory by a tone transmission device, and the digital data may be transformed into analog data and output for receipt by a mobile device. A tone may be output utilizing a wide variety of signals as desired in various embodiments of the invention. For example, in certain embodiments, the information carried in a tone may be added to a base or carrier signal by modulating the base signal.

FIG. 5 is a flowchart of one example method 500 for receiving information carrying tones at a mobile device, subsequent processing of the tone data by the mobile device, and/or providing feedback information from a mobile device, according to an illustrative embodiment of the invention. As described herein, receiving tone data at a mobile device of a mobile device user creates a variety of opportunity to efficiently and effectively interact with the mobile device user, such as opportunities to receive feedback information from the mobile device user and/or provide the mobile device user with additional content embodied in various forms in response to receiving user feedback information.

The method 500 may begin at block 505, in which a mobile device may receive a tone that includes tone data that contains and/or is associated with user prompting information (e.g., one or more location identifiers). The mobile device may be any mobile device, such as the mobile device 110 described in detail with reference to FIG. 1. Similarly, the tone may be transmitted to the mobile device in a manner similar to that described with reference to FIGS. 1-4, such as, but not limited to, via a television broadcast, radio broadcast, or a standalone tone transmission device.

For example, as described above, a mobile device user may cause the mobile device to receive a tone when one is being communicated, such as may be indicated in a radio or television broadcast or as may be stated in an advertisement display associated with a standalone tone transmission device. According to one embodiment, the mobile device may include programming instructions, such as the tone processing application 137 described with reference to FIG. 1, operable to provide a command to receive a tone being communicated. For example, the tone processing application may activate a microphone or other audio input device to capture the tone and store the tone and/or extracted tone data in memory.

Following block 505 is block 510, in which the mobile device may process the tone to extract the tone data. As described above with reference to FIG. 1, the tone data may be embodied in many forms and the tone may require additional processing to extract and/or further operate on the tone data. According to one embodiment, the tone data may include a location identifier that is generated and/or associated with user prompting information stored and/or maintained by an information source, such as a central information source and/or third party information source as described herein. Thus, as part of the processing performed at block 510, programming instructions, such as the tone processing application, and/or associated mobile device hardware, such as one or more band pass filters and one or more analog-to-digital converters, can process the tone to identify and extract tone data, including one or more location identifiers. In other embodiments of the invention, the tone data may include user prompting information, which may be extracted and output to the mobile device user and/or stored in the mobile device memory for later use. Additional processing, as further described herein, may be performed on the tone received by the mobile device, at this or any other point of the method 500.

According to one embodiment, tone processing may include associating mobile device or mobile device user specific information with the extracted tone data, such association and/or tone data may be subsequently transmitted to one or more information sources. For example, in one embodiment, the tone processing application may be configured to request input from the mobile device user, such as user-specific information, which may include information such as, but not limited to, name, street address, city, state, zip code, telephone number(s), email address, age information, preferences, identification number, user name, password information, account information, and/or the like. Additional input may also be requested. The input provided by the mobile device user may then be associated with the tone data in a memory of the mobile device, permitting the mobile device to subsequently transmit the information to an information source.

According to another embodiment, the tone processing application may be configured to extract pre-established information that may be used to identify the mobile device user, such as may be stored in a user profile, such as the user profile 138 described with reference to FIG. 1. For example, the user profile may include name, account number, email address, username, home address, area code, zip code, phone number, identification number, and/or other information that may be useful in responding to user prompting information. In certain embodiments, the user profile may include one or more user preferences associated with types of desired tones (e.g., tones carrying user prompting information such as location identifiers) and/or additional user prompting information that may be received and processed by the mobile device. For example, the user profile may include preferences indicating that certain tones and/or user prompting information should be or should not be received and/or processed by the mobile device. In this regard, tones and/or user prompting information may be filtered by the mobile device. A wide variety of different preferences and/or criteria may be utilized as desired in various embodiments, including but not limited to, merchant criteria, merchant class or merchant type criteria, broadcaster criteria, marketing source criteria, etc. As another example, the user profile may include one or more preferences associated with the manner in which tones and/or user prompting information should be processed by the mobile device.

In other example embodiments of the invention, user prompting information and/or feedback information may be stored in the user profile. Such user prompting information and/or user-specific feedback information may be utilized when communicating with an information source. In yet another embodiment, the tone processing application may be configured to extract information resident with the mobile device, such as a mobile device number, UICC identifier, UDID identifier, SIM card identifier, IMSI number, or mobile device number information which may also be transmitted to an information source to identify the mobile device user.

According to yet another embodiment, the tone processing application and/or the mobile device may not be configured to request input from the mobile device user until the mobile device receives a request from another entity, such as an information source. For example, a request for information may be transmitted after an information source is notified that the mobile device received a tone and respective tone data, as further described below.

Following block 510 is block 515, in which the tone data extracted from the tone and/or additional information input by the mobile device user may be stored in a memory of the mobile device. In some example embodiments, the tone data may be stored in the memory only temporarily, such as when it may be transmitted to retrieve user prompting information from another information source, or may be further operated on by the processor of the mobile device, such as to retrieve user prompting information stored in or otherwise accessible by the mobile device (e.g., stored in a user profile), to display information associated with the tone data, and/or to request information from the mobile device user of the mobile device. In other embodiments, the tone data may be permanently stored in the memory, or stored in the memory for a defined period of time. In yet other embodiments, the tone data may be immediately transmitted to another entity, such as an information source, and storage in memory for any prolonged period of time may be unnecessary.

Following block 515 is block 520, in which the mobile device may transmit to an information source an indication that the mobile device received the tone. The information source to which the indication can be transmitted may include, but is not limited to, a central information source, such as a back-end processor, or another entity, such as a third party information source associated with a merchant, manufacturer, or service provider associated with a product, service, or content associated with user prompting information. This transmission may be performed to inform the information source that the mobile device received the tone, and may include tone data extracted from the tone, such as a location identifier that may be extracted at block 510.

In other embodiments, however, the initial transmission from the mobile device to the information source may serve both to indicate that the mobile device received the tone and that the mobile device user of the mobile device wishes to receive user prompting information. As an example, according to one embodiment, when viewing a television broadcast, user prompting information may be displayed on the screen and/or described in the audio portion of the content. As part of the user prompting information, the instructions may indicate that the viewer may activate their mobile device to subsequently receive other tones. For example, a television broadcast may indicate to viewers that additional user prompting information, such as one or more prompts for voting information, rating information, content selection information, user preference information, and/or the like, may be received and/or retrieved by activating a mobile device to receive one or more tones. Upon receiving the tone, and extracting the location identifier or other tone data, the mobile device may transmit an indication to the information source that the user received the tone and the location identifier (or other unique identifier) extracted from the tone, which may serve to request additional information associated with the unique identifier (e.g., user prompting information) from the information source. According to another embodiment, however, a request for additional information may be transmitted separately from the indication that the mobile device received the tone.

Moreover, according to one embodiment, the indication transmitted at block 520 may also include an identifier of the mobile device and/or the mobile device user of the mobile device, such as is described above with reference to block 515. The identifier of the mobile device user and/or the mobile device may be used by the information source to associate subsequent information transmitted to/from the mobile device (e.g., update a user profile associated with the mobile device or mobile device user), as well as to identify the mobile device user to a third party information source, such as a merchant, manufacturer, or service provider.

Following block 520 is block 525, in which user prompting information may be received and/or displayed on the mobile device. In embodiments in which user prompting information may be requested (or automatically transmitted) after initially receiving the information carrying tone, the mobile device may receive user prompting information from an information source.

According to various embodiments, the user prompting information may be received by the mobile device via cellular communication, such as an SMS message, email, audio message, or a website address, for example. Upon receiving the user prompting information, the mobile device and its tone processing application may perform additional processing on the information prior to display to the mobile device user. In other embodiments, however, the mobile device may already have user prompting information stored in memory, such as information which may have been previously stored in memory of the mobile device when downloading a software application or associated application supplements. Information already stored in memory may be displayed separately or as a supplement to user prompting information received from an information source.

According to one embodiment, the mobile device may format and output the user prompting information to the mobile device user. For example, after any processing that may be required is performed, the user prompting information may be output in text form to a display screen or as an audio message played over a speaker.

According to another embodiment, however, the user prompting information may be presented by a website or other Internet-based application accessible over a cellular network (or other network, such as Wi-Fi network), such that when displaying user prompting information, the mobile device accesses a website providing the information. The website address or other identifier may be provided to the mobile device in response to transmitting the indication and/or request for information to an information source at block 520. According to other embodiments, however, the tone data transmitted with the tone and extracted by the mobile device at blocks 505 and 510 may also include website address information, eliminating the need to transmit a request for user prompting information from an information source. Providing the information via a website also allows for the dynamic delivery of additional content based on the mobile device user's access or selection within the website (e.g., hyperlinks), thereby expanding the volume of information that may be displayed to the mobile device user. However, some mobile devices may not be operable to access Internet-based applications; thus, text and/or audio data transmitted to the mobile device, as described above, permit user prompting information to be presented to the user.

User prompting information transmitted and/or displayed to the user may include, but is not limited to, requests for input from the mobile device user, such as one or more prompts for voting information, rating information, content selection information, user preference information, and/or the like. Moreover, while only a single message is described, user prompting information may be transmitted to and received by the mobile device as multiple messages.

Following block 525 is block 530, in which the mobile device user may provide feedback information to one or more information sources. In example embodiments of the invention, the feedback information may include voting information, rating information, content selection information, user preference information, other information that may be responsive to the user prompting information, and/or other information that relates to particular content, products, or services related to the tone received at the mobile device. In an example embodiment of the invention, the feedback information may be provided by the mobile device user in response to the user prompting information transmitted to the mobile device in block 525. In example embodiments of the invention the mobile device user may have entered the feedback information into the mobile device for transmission to one or more information sources (e.g., a central information source) for processing and/or further transmission to another entity (e.g., another information source, retailer, online merchant, etc.) for processing, as described in further detail with reference to FIGS. 6-7 below. In other embodiments of the invention, at least some of the feedback information is stored in the mobile device (e.g., in a user profile) and is retrieved and transmitted to one or more information sources for processing and/or further transmission to another entity (e.g., another information source, retailer, online merchant, etc.) for processing.

The feedback information may be transmitted to one or more information sources in various ways. Blocks 535, 540, 545, 550, 555 illustrate example techniques for presenting feedback information to one or more information sources. Though, as described herein, other means for transmitting feedback information may be employed, according to various embodiments of the invention.

According to one example embodiment, block 535 may follow block 530. At block 535, a mobile device user may provide feedback information to various information sources and/or terminals via email, SMS text messaging, or using short range wireless communications (e.g., Bluetooth messaging, etc.) of the mobile device. In some embodiments of the invention, the mobile device user may generate the email, text message, or other messaging to contain the feedback information for transmission to the one or more information sources. In other embodiments of the invention, the user prompting information received at the mobile device may prompt and/or pre-populate such response messaging (e.g., email, text message, etc.) to either include feedback information (e.g., stored information from a user profile) or be ready to receive feedback information from the mobile device user for transmission to one or more information sources.

According to yet another embodiment, block 540 may instead follow from block 530, in which a signal from another device in communication with the mobile device may transmit the feedback information to one or more information sources. For example, the mobile device may be in communication with a desktop computer, where the mobile device user may access a web browser on the desktop computer and provide feedback information through the web browser on the desktop computer. In other embodiments of the invention the mobile device user may access other devices, including other mobile devices, to provide the feedback information to one or more information sources.

According to yet another embodiment, block 545 may instead follow from block 530, in which the mobile device user may place a telephone call to provide the feedback information. In example embodiments of the invention, the tone data received by the mobile device may include a telephone number for a user to provide feedback information. In other embodiments the telephone number used to provide feedback information may be presented to the user through media content (e.g., advertisements, scrolls or graphics displayed on a television screen during a broadcast of a television program, etc.). In example embodiments of the invention, the mobile device user may provide verbal feedback information via the telephone call or may be prompted via an interactive voice response (IVR) system to provide feedback via keypad selections.

According to yet another embodiment, block 550 may follow block 530, in which a mobile device user may transmit a tone from the mobile device to a terminal to provide feedback information. For example, in one embodiment, the feedback information may be in the form of a tone carrying tone data that is associated with the user prompting information, associated with the mobile device user, and/or associated with an account associated with the mobile device user. In one example, the mobile device may be able to generate and transmit the tone after receiving, generating, and/or processing feedback information to be sent to one or more information sources.

Accordingly, in this example, a mobile device user may command the mobile device to transmit the tone to provide the feedback information. In one embodiment, the tone may be transmitted to a transaction terminal, such as a POS terminal operable with a receiver, such as a microphone or other transducer. In another embodiment, the tone may be transmitted to another mobile device for transaction processing (e.g., another mobile device in communication with or acting as a transaction terminal). A tone processing application of the mobile device user's mobile device, such as the tone processing application 137 described with reference to FIG. 1, can be configured for generating and/or retrieving the tone from memory and transmitting the tone from the mobile device, such as via a speaker of the mobile device, upon receiving the mobile device user's command to transmit the feedback information. According to another embodiment, instead of, or in addition to, transmitting a tone from the mobile device, a radio frequency signal may be transmitted to a transaction terminal or other transaction processor from the mobile device containing, or otherwise associated with, feedback information.

According to yet another embodiment, block 555 may follow block 530. At block 555, a mobile device user may provide feedback information during an online or mobile transaction. For example, feedback information may be entered or otherwise transmitted over a website, or other mobile transaction processing application. In one embodiment, the feedback information, such as voting information, rating information, content selection information, user preference information, other information that may be responsive to the user prompting information, and/or other information that relates to particular content, products, or services related to the tone received at the mobile device can be automatically associated with the online or mobile transaction information, such as by programming instructions stored on the mobile device, or automatically associated with the tone processing application or other transaction processing application. In another embodiment, the mobile device user may manually enter feedback information, such as voting information, rating information, content selection information, user preference information, etc., in an online or mobile transaction form for submission to one or more information sources for processing.

Following block 555 is block 560, in which additional content is received by the mobile device in response to the provided feedback information. In block 560, an information source (e.g., the central information source) or other entity involved in the feedback information processing and/or communication with the mobile device, may generate and/or transmit additional content that is received at the mobile device. In example embodiments of the invention, the content may provide additional information relating to the feedback information. In various example embodiments of the invention, the additional content provided to the mobile device may include, depending on the nature of the feedback information, (1) reward content for providing feedback information, for example, coupons for future purchases, (2) additional product or service information, (3) other mobile device user feedback information such as voting results, overall rating information, related or recommended content based on the mobile device user's or others' feedback information, (4) updated user profile information such as account information, (5) confirmation of receipt of the feedback information and/or updates made based on the feedback information, and/or (6) any other information that may be useful to the mobile device user having provided feedback information relating to media content, products, services, etc.

In example embodiments of the invention, the additional content may be transmitted to the mobile device associated with the mobile device user via email, SMS text messaging, to a browser via the Internet, via subsequent tones, etc. The method 500 may end after block 560, having received additional content at a mobile device in response to a mobile device user providing feedback information to one or more information sources. In other embodiments of the invention, receiving additional content at the mobile device in response to the mobile device user sending feedback information to one or more information sources may be unnecessary.

FIG. 6 is a flow chart of one example method for processing user prompting information and/or feedback information at an information source, according to an illustrative embodiment of the invention. For example, according to one embodiment, user prompting information may be tied to an event or activity, such as a television or radio broadcast, a sporting event, game show, specific time of day, etc., and a location identifier associated with user prompting information may be transmitted to a mobile device upon confirming that such an event or activity occurred and/or that the mobile device user participated or is participating in the event or activity.

The method 600 may provide for associating tones with user prompting information, transmitting information carrying tones to a mobile device, and subsequent communications with the mobile device based on the mobile device having received a given tone. Accordingly, an information source, such as a central information source, such as a back-end processor, or any third party information source, such as a merchant, manufacturer, service provider, and/or the like, can interact with consumers via their mobile device to obtain feedback information from the consumers for further processing (e.g., monitoring consumer preferences or behavior, customizing marketing efforts for a particular consumer or group of consumers, etc.).

The method 600 may begin at block 605, in which an information source may associate user prompting information with one or more tones to be transmitted to one or more mobile devices. At block 605, an information source may associate user prompting information with one or more tones (or tone data carried by the tones) to be transmitted to one or more mobile devices. For example, a location identifier may be created that associated a particular tone with particular user prompting information. The location identifier may then be included in the tone as tone data. The information source may be any information source, such as the information source 115 described in detail with reference to FIG. 1.

In one example, a central information source may receive user prompting information from another entity, such as any third party entity associated with a product, service, or content associated with the user prompting information. The central information source may then store the user prompting information in memory, such as in one or more databases or other data storage devices, associated with tones and/or tone data. For example, as described in more detail herein with reference to FIG. 1, tone data transmitted by a tone, such as a location identifier or other unique identifier, may be associated with the user prompting information such that it may be used to identify the user prompting information when received. The tone data may permit the central information source (or other entity) to search for user prompting information stored in a memory. In one embodiment, tone data may include a location identifier or other unique identifier that indicates another information source, such as a third party information source, whereby the location identifier can be utilized to request user prompting information from another information source, such as is described in detail with reference to FIG. 7 for example.

Following block 605 is block 610, in which one or more information carrying tones associated with the user prompting information are transmitted to the mobile device. Tones may be transmitted to a mobile device using any tone transmission device, such as one or more tone transmission devices 105 described with reference to FIG. 1. For example, a tone transmission device may include, but is not limited to, such as a television transmitting audiovisual content, a radio transmitter transmitting radio content, or a standalone tone transmission device. The mobile device may be any mobile device, such as the mobile device 110 as described with reference to FIG. 1.

In example embodiments, a mobile device may perform additional processing of a received tone, such as to extract tone data from the tone. In one example, the mobile device may perform processing to extract a location identifier or other unique identifier that is associated with user prompting information, as described with reference to block 605. In other embodiments, the mobile device may perform additional processing, including, but not limited to, storing the received tone and/or the extracted tone data in memory, retrieving additional information from a memory of the mobile device, requesting input from a mobile device user, and/or receiving the mobile device user's input, prior to any subsequent transmissions with an information source in response to receiving a tone.

Following block 610 is block 615, in which an information source receives an indication that the mobile device received the tone transmitted at block 610. The indication may be received to inform the information source that the mobile device received the tone, and may, in some example embodiments, include tone data extracted from the tone, such as a location identifier or other unique identifier. In other embodiments, however, the initial receipt of the indication from the mobile device may serve both to indicate that the mobile device received the tone and to request user prompting information, such as one or more prompts for voting information, rating information, content selection information, user preference information, and/or the like.

In example embodiments, the indication received at block 615 can include one or more of a location identifier or other unique identifier extracted from the tone, an identifier of the mobile device, and/or an identifier of the mobile device user. The identifier of the mobile device and/or mobile device user may be used by the information source to associate subsequent information transmitted to/from the mobile device, and/or to identify the mobile device user to a third party information source, such as a retailer, service provider, product manufacturer, etc. According to one embodiment, one or more of the identifiers of the mobile device user or the mobile device may be stored in a user profile associated with the mobile device, such as the user profile 138 as described with reference to FIG. 1.

In other embodiments, however, multiple messages may be received from the mobile device at block 615. For example, one or more separate messages may be transmitted from the mobile device identifying the tone data, the mobile device, the mobile device user, and/or any other information. In another example, one or more separate message may be transmitted from the mobile device requesting user prompting information or other processing such as feedback information processing, usage tracking, etc.

Moreover, according to one embodiment, the information source operable to receive the indication at block 615 can be the same information source, or one associated therewith, that associates the feedback information to the tone, such as the central information source described at block 605. For example, the central information source may be responsible for generating the user prompting information, storing the user prompting information, associating user prompting information to one or more tones, and subsequently processing user prompting information. Though, in other embodiments, the information source operable to receive the indication at block 615 may be a different information source from the information source that associates the user prompting information to the tone at block 605. For example, a third party information source, such as a different back-end processor, may participate in processing user prompting information for a mobile device user, instead of or in addition to the central information source. In yet other embodiments, a central information source and one or more third party information sources may participate together, exchanging information therebetween, to retrieve and/or transmit user prompting information, as described in detail with reference to FIG. 7.

Following block 615 is block 620, in which user prompting information is retrieved from one or more information sources. In example embodiments of the invention, the information source may retrieve user prompting information from memory based on the one or more location identifiers received from the mobile device identifying the memory location and/or other entity where the associated user prompting information is stored. In yet other embodiments, a central information source and one or more third party information sources may participate together, exchanging information therebetween, to retrieve and/or transmit user prompting information, as described in detail with reference to FIG. 7, for example.

Following block 620 is block 625, in which user prompting information is transmitted to the mobile device user. The user prompting information transmitted may be one or more user interfaces, prompts, and/or inquiries for voting information, rating information, content selection information, user preference information, and/or the like. In example embodiments of the invention, the transmitted user prompting information may be sent via email, SMS text messaging, to a browser via the Internet, subsequent tones, etc.

Following block 625 is block 630, in which feedback information is received at one or more information sources from the mobile device. In example embodiments of the invention, the feedback information may include voting information, rating information, content selection information, user preference information, other information that may be responsive to the user prompting information, and/or other information that relates to particular content, products, or services related to the tone received at the mobile device. In an example embodiment of the invention, the feedback information may be received in response to the user prompting information transmitted to the mobile device in block 625. In example embodiments of the invention the mobile device user may have entered the feedback information into the mobile device for transmission to one or more information sources (e.g., a central information source) for processing and/or further transmission to another entity (e.g., another information source, retailer, online merchant, etc.) for processing. In other embodiments of the invention, at least some of the feedback information was stored in the mobile device (e.g., in a user profile) and was retrieved and transmitted to one or more information sources for processing and/or further transmission to another entity (e.g., another information source, retailer, online merchant, etc.) for processing.

Following block 630 is block 635, in which the feedback information may be processed by the information source. In some example embodiments, the information source may, itself, parse the feedback information and process the parsed information. Such processing may include marketing analysis and/or reporting (e.g., analyzing consumer satisfaction or dissatisfaction with content, such as a television or radio show, particular entity, brand, person, product, service, etc., to make future marketing and/or content decisions), individual consumer preference and/or activity updates (e.g., updating a user profile associated with that particular mobile device user based on the feedback information tracking user preferences for the user to access and use or to provide more targeted content to that mobile device user), determining additional content to present to the mobile device user in response to the feedback (e.g., determining reward content, such as coupons, vouchers, discount information, to be provided in response to receiving feedback information, retrieving results of other user's feedback information for presentation to the mobile device user, or determining content recommendations based on the feedback information or others' feedback information) and/or other processing performed using the feedback information received from the mobile device. Other forms of feedback information processing may also be incorporated in example embodiments of the invention.

In other embodiments of the invention, the information source that received the feedback information may forward that information to other entities (e.g., another information source, retailer, online merchant, etc.) for additional processing, and/or the information source may work in conjunction with such other entities to process the feedback information similar to the processing described above.

Whether or not it is the receiving information source or another entity that processes the feedback information, block 640 is invoked after block 635 to provide additional content to the mobile device user in response to the received feedback information. In block 640, an information source (e.g., the central information source) or other entity involved in the feedback information processing and/or communication with the mobile device, may generate and/or transmit additional content to the mobile device user.

In example embodiments of the invention, the content may provide additional information relating to the feedback information. In various example embodiments of the invention, the additional content provided to the mobile device may include, depending on the nature of the feedback information, (1) reward content for providing feedback information, for example, coupons for future purchases, (2) additional product or service information, (3) other mobile device user feedback information such as voting results, overall rating information, related or recommended content based on the mobile device user's or others' feedback information, (4) updated user profile information such as account information, (5) confirmation of receipt of the feedback information and/or updates made based on the feedback information, and/or (6) any other information that may be useful to the mobile device user having provided feedback information relating to media content, products, services, etc.

In some example embodiments of the invention, the additional content may be transmitted to the mobile device associated with the mobile device user via email, SMS text messaging, to a browser via the Internet, subsequent tones, etc. In other example embodiments of the invention, the additional content may be provided to the mobile device user separate from the mobile device (e.g., mail, television, radio, telephone, desktop computer, etc.). The method 600 may end after block 640, having communicated additional content to a mobile device user in response to receiving feedback information from the mobile device user. In other embodiments of the invention, providing additional content to the mobile device user in response to receiving feedback information from that mobile device user may be unnecessary.

FIG. 7 is a flow chart of one example method for processing user prompting information and/or mobile device user feedback information with multiple information sources, according to an illustrative embodiment of the invention. The method 700 may provide integration between a central information source and one or more third party information sources, distributing the roles and responsibilities therebetween. By distributing some functions to be performed to one or more third party information sources, the amount of data and transaction processing managed by a central information source may be reduced. In addition, by including the third party information sources, such as those sponsoring or otherwise associated with user prompting information, additional rules and business logic may be implemented by each third party information source that is particular to that entity and/or more specific to user prompting information and/or the product, service, or content associated with the user prompting information. It may be beneficial to limit the amount of information provided to and/or processed by a central information source, such as to maintain company trade secrets, business advantages, marketing information, user prompting information, feedback information, and/or the like. Accordingly, the method 700 provides one example embodiment of limiting that amount of information and/or transaction processing performed by a central information source by integrating the use of one or more third party information sources into the process.

The method 700 may begin at block 705. At block 705, a central information source receives an indication that a mobile device received a tone that contained and/or has been associated with user prompting information. Following block 705 is block 710, in which the central information source may identify particular user prompting information with which the received tone (e.g., a location identifier contained in the received tone) contained or is otherwise associated. In one example embodiment, the central information source may store user prompting information in a memory, such as in a look-up table, relational database, or other data storage means. In another embodiment, the central information source may just associate tone data, such as a location identifier or other unique identifier with one or more third party information sources, such that the central information source need only to transmit the location identifier or other unique identifier to the proper third party information source, which can reply with associated user prompting information and/or continue soliciting feedback information and/or handle feedback information processing directly with the mobile device or mobile device user.

Following block 710 is block 715, in which the central information source may associate the mobile device user (or associate the mobile device) with the user prompting information identified in block 710 and/or associate the mobile device user (or associate the mobile device) with user feedback information provided in response to user prompting information. For example, the central information source at block 705 may store mobile device identifiers (e.g., telephone number, a UICC identifier, UDID identifier, a SIM card identifier, a IMSI number, etc.) and/or mobile device user identifiers (e.g., a telephone number, name, username, email address, account number, identification number, etc.) in memory, such as in one or more records associated with user prompting information and/or user feedback information provided in response to user prompting information transmitted to a mobile device. In another embodiment, the mobile device identifier alone may be used to identify the mobile device user, and no further association with the mobile device user may be performed. The mobile device identifier and/or mobile device user identifier may be provided automatically as part of the message received from the mobile device, may be provided by the mobile device user entering such information into the mobile device, may be provided in a separate message, or may be previously stored in memory, such as if the mobile device user has previously registered with the central information source (or other entity). According to one example, the mobile device may include programming instructions and a user profile, such as the tone processing application 137 and the user profile 138 described with reference to FIG. 1, which together are operable to retrieve mobile device identifiers and/or mobile device user identifiers stored in the user profile and may be included in one or more messages transmitted to the central information source (or other information source). In other examples, one or more messages transmitted to an information source may automatically include a mobile device identifier and/or mobile device user identifier, such as a telephone number.

By associating the mobile device user (or the mobile device) with the user prompting information, the central information source and any subsequent third party information sources, may have a record of which mobile device user received a tone. Such a record may be used to facilitate feedback information processing (e.g., marketing analysis and/or reporting efforts) and/or providing additional content in response to feedback information received from a mobile device in response to the user prompting information provided to that mobile device.

Following block 715 is block 720, in which the central information source may determine one or more third party information sources associated with the user prompting information identified at block 710 and/or any particular content, product, or service associated with the identified user prompting information. As described above, the central information source may store, in a memory, an association between the respective message transmitted to an information source (or tone data contained in the message) and a third party associated with the respective user prompting information.

Following block 720 is block 725, in which the central information source may transmit a message to the third party information source identified at block 720. In various embodiments, the message may include the tone data received with the indication at block 705, any user prompting information that may be stored by the central information source and retrieved at block 710, mobile device user identifiers and/or mobile device identifiers determined at block 715, feedback information data received from a mobile device, and/or the like. The central information source and any third party information sources may communicate over a network, such as the network 140 described in detail with reference to FIG. 1.

In one embodiment, the central information source may transmit the tone data, other user prompting information, and/or a mobile device user identifier to the third party information source, thereby leaving any additional communications and transaction processing to the third party information source. For example, the third party information source can then communicate directly with the mobile device (or with the mobile device user by any other means) to provide user prompting information and/or receive feedback information from the mobile device. Accordingly, no further processing and/or communications would be required by the central information source. Though, in one embodiment, the third party information source may communicate a status update to the central information source for reporting, record keeping, and/or the like.

In another embodiment, the central information source may act more as an intermediary between the mobile device and the third party information source. For example, upon receiving the indication that the mobile device has received the tone, the central information source may transmit the tone data and/or other user prompting information with a mobile device user identifier to one or more third party information sources, and receive subsequent instructions and/or messages from the third party information source(s) for relaying to the mobile device or mobile device user. As another example, the information source may transmit feedback information received from the mobile device in response to the user prompting information provided to the mobile device to the third party information source for processing.

In yet another embodiment, the central information source may perform much of the transaction processing, including providing user prompting information to the mobile device and/or mobile device user, receiving feedback information from the mobile device, and/or transmitting status updates and/or other messages (e.g., feedback information received from the mobile device) to the third party information source. Thus, in one embodiment, the messages transmitted at block 725 may be updates or only require minimal processing by the third party information source.

Following block 725 is block 730, in which the central information source may receive communications from the third party information source in response to the communications sent in block 725. According to one embodiment, the third party information source may transmit message information to be sent by the central information source to the mobile device, such as user prompting information. According to another embodiment, the third party information source may transmit status updates to the central information source in response to communicating directly with the mobile device.

In one embodiment, the central information source may store information contained in the communications received at block 730 in a memory. For example, the information received may be stored for subsequent retrieval and transmission to the mobile device. In another example, the information received may be stored for reporting, transaction tracking, and/or subsequent marketing communications.

Following block 730 is block 735, in which the central information source may optionally transmit user prompting information to the mobile device user. As described above, the information may be transmitted to the mobile device user via the mobile device, for example, the information may be transmitted over the Internet via a website, a telephone message, via email, and/or the like. In other embodiments of the invention, such information may be accessible via means other than the mobile device. In one embodiment, the user prompting information may be received from the third party information source at block 730 and transmitted to the mobile device by the central information source. As described above with reference to block 725, in one embodiment, the third party information source may perform all or most of the additional communications with the mobile device and/or the mobile device user such that block 735 may not be performed by the central information source.

In various embodiments, blocks 725-735 may be repeated to permit multiple messages being transmitted between the central information source, the third party information source, and/or the mobile device.

The method 700 may end after block 735, having divided some of the transaction processing tasks between the central information source and one or more third party information sources.

Accordingly, example embodiments provide systems and methods that communicating location identifiers and/or other user prompting information to a mobile device user, and processing the location identifiers and/or other user prompting information to prompt the mobile device user for various types of feedback information such as voting information, rating information, content selection information, and/or user preference information. By associating user prompting information with a tone, more potential customers may be reached, due to the simplicity of interacting with the mobile device and the immediate results made possible by real-time messaging with central and/or third party information sources. Furthermore, communicating location identifiers and/or other user prompting information to a mobile device user to prompt the mobile device user to provide feedback information allows for more sophisticated and effective marketing efforts and/or targeted content to be provided to the mobile device user and/or other mobile device users.

Example embodiments provide the technical effects of systems and methods for communicating location identifiers and/or other user prompting information to a mobile device user, and processing the location identifiers and/or other user prompting information to prompt the mobile device user for various types of feedback information such as voting information, rating information, content selection information, and/or user preference information. Additional technical effects include providing mobile devices operable to receive tones and extract one or more location identifiers therefrom, to perform additional processing, display, and messaging related to prompts and/or user interfaces associated with the extracted location identifiers by utilizing real-time messaging between mobile devices and central and/or third party information sources. Moreover, additional technical effects include one or more information sources configured to store and associate location identifiers with user prompting information, communicate with mobile devices, communicate with other information sources, and perform additional processing to facilitate the receipt of consumer feedback information from a mobile device user for market analysis and/or to determine and provide targeted content to the mobile device user and/or other mobile device users as a result of processing such consumer feedback information.

Embodiments of the invention have been described herein with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments can provide certain systems and methods that transform a tone or multiple tones to prompts or user interfaces requesting feedback information from mobile device users, which can include transforming one or more tones into location identifiers and/or user prompting information, as described above.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising:
    a memory for storing computer-executable instructions; and
    an information source processor in communication with the memory, wherein the processor is configured to execute the computer-executable instructions to:
    transmit a location identifier to a tone transmission device at a merchant location in response to activation of a sensor associated with the tone transmission device, thereby causing the tone transmission device to output a plurality of tones, wherein the location identifier is embedded by the tone transmission device in a data portion of a first tone, and wherein the first tone is comprised in the plurality of tones;
    receive, from a mobile device located within a predetermined distance of the tone transmission device, an indication that the mobile device has received the first tone from the transmission device, wherein the indication comprises the location identifier and a mobile device identifier, wherein the location identifier is extracted from the data portion of the first tone by the mobile device, wherein the first tone is filtered from the plurality of tones by the mobile device based on user preference information stored in a user profile associated with the mobile device, wherein the user preference information indicates which tones the mobile device is enabled to receive, and wherein the user profile comprises the mobile device identifier;
    transmit, to a third-party information source associated with the location identifier, a user interface request;
    receive, from the third-party information source in response to the user interface request, a user interface;
    transmit the user interface to the mobile device via a second tone, the user interface comprising one or more prompts for user preference information;
    receive user preference information from the mobile device based at least in part on transmitting the user interface to the mobile device;
    update the user profile associated with the mobile device based on the received user preference information, thereby resulting in an updated user profile of the mobile device;
    determine additional content to present to the mobile device based on the updated user profile of the mobile device;
    transmit the additional content to the mobile device via a third tone, the additional content comprising a message indicating confirmation of receipt of the user preference information by the information source processor, a message indicating confirmation of updates made to the user profile of the mobile device based on the user preference information, and a coupon for redemption at the merchant location; and
    transmit, to the third-party information source, the updated user profile of the mobile device.

2. The system of claim 1, wherein the first tone including the embedded location identifier, the second tone, and the third tone are substantially inaudible to the human ear.

3. The system of claim 1, wherein the information source processor is further configured to execute the computer-executable instructions to:
    receive the user preference information from a mobile device in response to transmitting the user interface to the mobile device; and
    store the user preference information.

4. A method comprising:
    transmitting, by the information source processor, a location identifier to a tone transmission device at a merchant location in response to activation of a sensor associated with the tone transmission device, thereby causing the tone transmission device to output a plurality of tones, wherein the location identifier is embedded by the tone transmission device in a data portion of a first tone, and wherein the first tone is comprised in the plurality of tones;
    receiving, by the information source processor from a mobile device located within a predetermined distance of the tone transmission device, an indication that the mobile device has received the first tone from the transmission device, wherein the indication comprises the location identifier and a mobile device identifier, wherein the location identifier is extracted from the data portion of the first tone by the mobile device, wherein the first tone is filtered from the plurality of tones by the mobile device based on user preference information stored in a user profile associated with the mobile device, wherein the user preference information indicates which tones the mobile device is enabled to receive, and wherein the user profile comprises the mobile device identifier;

transmitting, by the information source processor to a third-party information source associated with the location identifier, a user interface request;

receiving, by the information source processor from third-party information source in response to the user interface request, a user interface;

transmitting, by the information source processor, the user interface to the mobile device via a second tone, the user interface comprising one or more prompts for user preference information;

receiving, by the information source processor, user preference information from the mobile device based at least in part on transmitting the user interface to the mobile device;

updating, by the information source processor, the user profile associated with the mobile device based on the received user preference information, thereby resulting in an updated user profile of the mobile device;

determining, by the information source processor, additional content to present to the mobile device based on the updated user profile of the mobile device;

transmitting, by the information source processor, the additional content to the mobile device via a third tone, the additional content comprising a message indicating confirmation of receipt of the user preference information by the information source processor, a message indicating confirmation of updates made to the user profile of the mobile device based on the user preference information, and a coupon for redemption at the merchant location; and transmitting, by the information source processor and to the third-party information source, the updated user profile of the mobile device.

5. The method of claim 4, wherein the first tone including the embedded location identifier, the second tone, and the third tone are between 16 KHz and 22 kHz.

6. The method of claim 4, further comprising:

receiving, by the information source processor, the user preference information from a mobile device in response to transmitting the user interface to the mobile device; and storing, by the information source processor, the user preference information in the memory.

* * * * *